US012799907B2

(12) United States Patent
Ostdiek et al.

(10) Patent No.: US 12,799,907 B2
(45) Date of Patent: Nov. 17, 2026

(54) ELECTRIC PROPULSOR

(71) Applicants: General Electric Company, Schenectady, NY (US); General Electric Deutschland Holding GmbH, Frankfurt (DE)

(72) Inventors: David Marion Ostdiek, Liberty Township, OH (US); William Joseph Solomon, Montgomery, OH (US); Mohamed Osama, Garching (DE); Arthur William Sibbach, Boxford, MA (US); Randy M. Vondrell, Cincinnati, OH (US)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/042,096

(22) Filed: Jan. 31, 2025

(65) Prior Publication Data

US 2025/0171153 A1 May 29, 2025

Related U.S. Application Data

(63) Continuation of application No. 18/079,072, filed on Dec. 12, 2022, now Pat. No. 12,240,615.

(51) Int. Cl.
*F02K 5/00* (2006.01)
*B64D 27/34* (2024.01)
(Continued)

(52) U.S. Cl.
CPC ................ *F02K 5/00* (2013.01); *B64D 27/34* (2024.01); *B64D 33/08* (2013.01); *F02C 7/18* (2013.01)

(58) Field of Classification Search
CPC ........... B64D 27/34; B64D 33/08; F02K 5/00; F01D 9/065
See application file for complete search history.

(56) References Cited

U.S. PATENT DOCUMENTS 6,058,696 A * 5/2000 Nikkanen ................. F02C 7/04 60/262
6,282,881 B1 9/2001 Beutin et al.
(Continued)

FOREIGN PATENT DOCUMENTS

FR 2958974 A1 10/2011

*Primary Examiner* — Katheryn A Malatek
(74) *Attorney, Agent, or Firm* — Dority & Manning, P.A.

(57) ABSTRACT

An electric propulsor is provided. The electric propulsor includes a core cowl and an outer cowl. A first air flowpath is defined radially outward of the outer cowl and a second air flowpath is defined between the core cowl and the outer cowl. The electric propulsor also includes one or more electric machines, a fan rotatably drivable by at least one electric machine, and a booster having a plurality of airfoils disposed at least in part in the second air flowpath, the booster being rotatably drivable by at least one electric machine for compressing air flowing along the second air flowpath. The electric propulsor further includes a heat exchanger disposed within the second air flowpath downstream of the booster, the heat exchanger being in thermal communication with at least one of the one or more electric machines and/or a gearbox mechanically coupled with the fan.

20 Claims, 12 Drawing Sheets

(51) Int. Cl.
*B64D 33/08* (2006.01)
*F02C 7/18* (2006.01)

(56) References Cited

U.S. PATENT DOCUMENTS

| | | | | |
|---|---|---|---|---|
| 9,175,695 | B2 | 11/2015 | Bulin et al. | |
| 10,138,752 | B2 | 11/2018 | Schilling | |
| 10,538,337 | B2 | 1/2020 | Vondrell et al. | |
| 10,774,741 | B2 | 9/2020 | Sennoun | |
| 10,883,422 | B2 | 1/2021 | Boujida et al. | |
| 10,927,761 | B2 | 2/2021 | Rambo | |
| 11,105,340 | B2 | 8/2021 | Cheung et al. | |
| 2011/0179767 | A1 | 7/2011 | Rinjonneau et al. | |
| 2017/0226959 | A1* | 8/2017 | Julien | F02B 63/06 |
| 2018/0050810 | A1* | 2/2018 | Niergarth | F02C 6/206 |
| 2018/0051702 | A1* | 2/2018 | Kupiszewski | B64D 33/00 |
| 2018/0051716 | A1 | 2/2018 | Cheung et al. | |
| 2018/0163558 | A1 | 6/2018 | Vondrell et al. | |
| 2019/0323427 | A1 | 10/2019 | Mackin | |
| 2020/0010208 | A1 | 1/2020 | Peace et al. | |
| 2020/0039654 | A1 | 2/2020 | Smith et al. | |
| 2020/0070988 | A1 | 3/2020 | Harvey | |
| 2020/0392904 | A1* | 12/2020 | Kupratis | F02C 7/36 |
| 2021/0010384 | A1* | 1/2021 | Bradley | F01D 15/10 |
| 2021/0013768 | A1 | 1/2021 | Schöll | |
| 2021/0108597 | A1 | 4/2021 | Ostdiek et al. | |
| 2022/0355943 | A1 | 11/2022 | Carretero Benignos et al. | |
| 2023/0167775 | A1 | 6/2023 | Sellers et al. | |

* cited by examiner

ELECTRIC PROPULSOR

CROSS-REFERENCE TO RELATED APPLICATIONS

This application is a continuation application of U.S. application Ser. No. 18/079,072 filed Dec. 12, 2022, which is hereby incorporated by reference in its entirety.

FIELD

The present disclosure relates to electric propulsors, such as electric propulsors for aircraft.

BACKGROUND

Electric propulsion systems are being developed to improve an efficiency of aircraft. Such electric propulsion systems can include an electric propulsor having a fan and an electric machine for rotatably driving the fan. A gearbox can mechanically couple the fan and the electric machine. An electric propulsor having cooling features for cooling elements of the electric propulsor, such as an electric machine and a gearbox thereof, would be a welcome addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
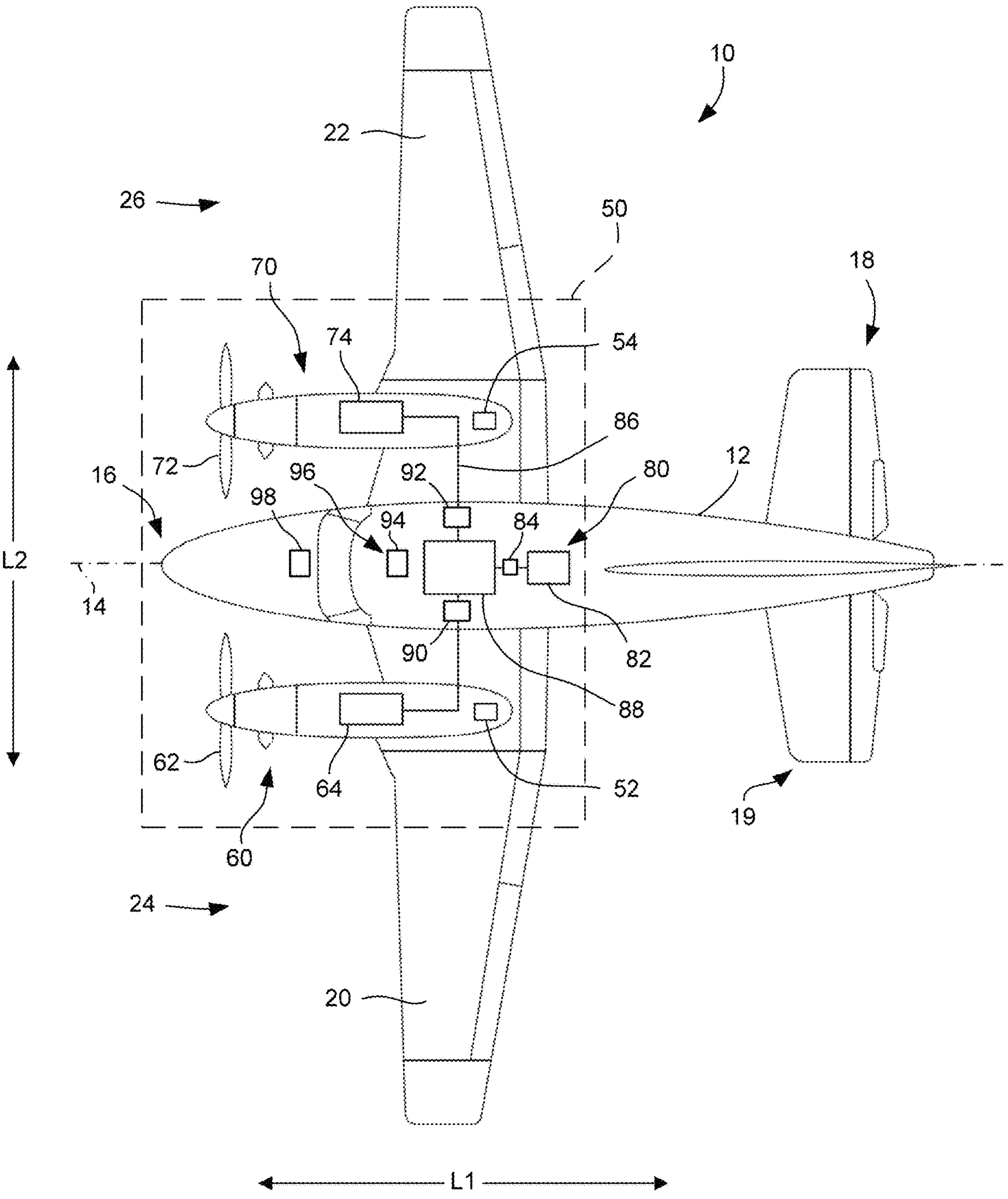
FIG. 1 is a schematic top view of an aircraft having an electric propulsion system in accordance with example aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The singular forms "a", "an", and "the" include plural references unless the context clearly dictates otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure relates to electric propulsors for vehicles, such as aircraft. An electric propulsor can include a fan and an electric machine for rotatably driving the fan. A gearbox can mechanically couple the fan and the electric machine. There are certain challenges associated with cooling a gearbox and/or an electric machine of an electric propulsor. For instance, cooling such elements may be particularly challenging after landing an aircraft to which the electric propulsor is mounted, e.g., during taxiing or while parked, as air cooling may be insufficient or cooling circuits may be tied to the thrust producing elements of the electric propulsor. This may cause more use of brakes and/or may force the thrust producing elements to produce more than a desired amount of thrust simply to cool the gearbox and/or electric machine.

Accordingly, in accordance with the inventive aspects of the present disclosure, various embodiments of electric propulsors are disclosed that address one or more of these challenges. In one example aspect, an electric propulsor includes features that may provide enhanced cooling of an electric machine and/or an optional gearbox of the electric propulsor. Particularly, the electric propulsor can include a core cowl and an outer cowl. A first air flowpath is defined outward of the outer cowl, and a second air flowpath is defined between the core cowl and the outer cowl. The electric propulsor also includes one or more electric machines, a fan driven by the one or more electric machines, a booster having one or more arrays of airfoils positioned at least in part in the second air flowpath and rotatably drivable by the one or more electric machines, and one or more heat exchangers positioned in the second air flowpath downstream of the booster. The one or more heat exchangers are in thermal communication with the one or more electric machines and/or the gearbox for providing cooling thereto. Advantageously, the booster may boost or increase the pressure of the air flowing along the second air flowpath, which increases the cooling capability of the one or more heat exchangers. The increased cooling capability of the one or more heat exchangers may enhance the cooling of the one or more electric machines and/or optional gearbox.

In some embodiments, the fan, booster, and various pumps of an electric propulsor can be independently driven by separate electric machines or mechanically decoupled so as to decouple the thrust producing elements from the pumps driving cooling fluid between the one or more heat exchangers and the one or more electric machines and/or gearbox. This may advantageously allow for cooling of the one or more electric machines and/or gearbox on an as needed basis independently of the demanded thrust output of the electric propulsor. Also, the decoupling of the thrust producing elements from the pumps may be particularly advantageous after landing of an aircraft, when significant thrust or no thrust at all is needed yet cooling of such components is beneficial. This may prevent a soak back condition prior to complete shutdown, which results in the magnetic materials in an electric machine from exceeding their Curie temperature. If such a condition occurs, a restart of the electric propulsor may not be possible until the electric machine is cooled off, which may extend turnaround time.

Further, electric machines of known aviation electric propulsors can typically sufficiently cool such components via air cooling for applications up to about fifty kilowatts (50 KW). Above 50 kW, air cooling may be insufficient for cooling electric machines and/or gearboxes of conventional propulsors. In the transition region near 50 kW, pressurized air cooling provided by a booster of an electric propulsor of the present disclosure may be able to sufficiently cool the electric machine. This regard, beneficially, the electric propulsors of the present disclosure can provide sufficient air cooling capability of applications in the transition region near 50 kW. In addition, the electric propulsors disclosed herein may provide other advantages, benefits, and technical effects not expressly mentioned herein.

Referring now to the drawings, wherein identical numerals indicate the same elements throughout the figures, FIG. 1 provides a schematic top view of an aircraft 10 in accordance with an exemplary aspect of the present disclosure. As shown, the aircraft 10 defines a longitudinal direction L1 and a longitudinal centerline 14 that extends along the longitudinal direction L1 through the aircraft 10. The aircraft 10 also defines a lateral direction L2 extending orthogonal to the longitudinal direction L1. The aircraft 10 extends between a forward end 16 and an aft end 18, e.g., along the longitudinal direction L1.

The aircraft 10 includes a fuselage 12 extending longitudinally from the forward end 16 of the aircraft 10 to the aft end 18 of the aircraft 10. The aircraft 10 includes an empennage 19 at its aft end 18. Additionally, the aircraft 10 includes a wing assembly including a first, port side wing 20 and a second, starboard side wing 22. The first and second wings 20, 22 each extend laterally outward from the fuselage 12 along the lateral direction L2. The first wing 20 and a portion of the fuselage 12 together define a first side 24 of the aircraft 10, and the second wing 22 and another portion of the fuselage 12 together define a second side 26 of the aircraft 10. For this embodiment, the first side 24 of the aircraft 10 is configured as the port side of the aircraft 10, and the second side 26 of the aircraft 10 is configured as the starboard side of the aircraft 10.

Each wing 20, 22 includes various control surfaces, e.g., flaps, ailerons, trim surfaces, etc., for controlling and maneuvering the aircraft 10. The empennage 19 of the aircraft 10 includes a vertical stabilizer having a rudder flap for yaw control and a pair of horizontal stabilizers each having an elevator flap for pitch control. It should be appreciated however, that in other embodiments of the present disclosure, the aircraft 10 may additionally or alternatively include any other suitable configuration. For example, in other embodiments, the aircraft 10 may include any other configuration of stabilizers.

Further, the aircraft 10 of FIG. 1 includes an electric propulsion system 50. The electric propulsion system 50 includes a first electric propulsor 60 and a second electric propulsor 70. For the embodiment depicted, the first electric propulsor 60 and second electric propulsor 70 are each configured in a wing-mounted configuration. The first electric propulsor 60 is mounted to the first wing 20 and the second electric propulsor 70 is mounted to the second wing 22. However, one or both of the first and second electric propulsors 60, 70 may be mounted in other locations in other embodiments.

The first electric propulsor 60 includes an electric machine 64 for rotatably driving a fan 62 or propulsor, which is an open rotor fan in the depicted embodiment of FIG. 1. The electric machine 64 can be mechanically coupled with the fan 62, e.g., in a direct drive configuration or via a gearbox. A gearbox can include a plurality of gears for stepping down the rotational speed of the output shaft of the electric machine 64 to provide a more efficient rotational speed of the fan 62. For this embodiment, the electric machine 64 is a combination motor/generator. In this regard, the electric machine 64 can function as a torque source or electric motor to drive the fan 62 in some modes of operation, such as in normal operations to produce thrust, and may be driven by the fan 62 to generate electrical power in other modes of operation, such as in a windmilling operation. In other embodiments, the electric machine 64 can be an electric motor.

The second electric propulsor 70 is configured in a similar manner as the first electric propulsor 60. Particularly, the second electric propulsor 70 includes an electric machine 74 for rotatably driving a fan 72 or propulsor, which is an open rotor fan in the depicted embodiment of FIG. 1. The electric machine 74 can be mechanically coupled with the fan 72, e.g., in a direct drive configuration or via a gearbox. A gearbox can include a plurality of gears for stepping down the rotational speed of the output shaft of the electric machine 74 to provide a more efficient rotational speed of the fan 72. For this embodiment, the electric machine 74 is a combination motor/generator. In this regard, the electric machine 74 can function as a torque source or electric motor to drive the fan 72 in some modes of operation, such as in normal operations to produce thrust, and may be driven by the fan 72 to generate electrical power in other modes of operation, such as in a windmilling operation. In other embodiments, the electric machine 74 can be an electric motor.

The electric propulsion system 50 further includes an electric energy storage system 80. The electric energy storage system 80 can include one or more electric energy storage devices, such as batteries, supercapacitor arrays, one or more ultracapacitor arrays, some combination of the foregoing, etc. For instance, for this embodiment, the electric energy storage system 80 includes a battery 82. The battery 82 is electrically coupled with a direct current to direct current (DC/DC) converter (or DC/DC converter 84) or voltage-regulating power supply. In some embodiments, the DC/DC converter 84 can be a bidirectional DC/DC converter. In this regard, the DC/DC converter 84 can control the electrical power drawn from the battery 82 and the electrical power provided to the battery 82 depending on whether it is desired to discharge or charge the battery 82. The DC/DC converter 84 is electrically coupled with a power bus 86.

A power distribution unit 88 is positioned along the power bus 86. The power distribution unit 88 can be controlled to distribute electrical power to various loads of the aircraft 10. For instance, electrical power drawn from the battery 82 can be directed to the power distribution unit 88 across the power bus 86, and the power distribution unit 88 can distribute the electrical power to various aircraft loads, such as the electric machine 64 and/or the electric machine 74. A first alternating current to direct current (AC/DC) converter (or first DC/AC converter 90) associated with the electric machine 64 can be positioned along the power bus 86 for converting direct current into alternating current or vice versa. Similarly, a second AC/DC converter (or second DC/AC converter 92) associated with the electric machine 74 can be positioned along the power bus 86 for converting direct current into alternating current or vice versa. The first AC/DC converter 90 and the second AC/DC converter 92 can both be bidirectional converters.

The power distribution unit 88 and other controllable electrical elements of the electric propulsion system 50 can be managed by a power management system. The power management system can include a supervisor controller 94 operable to control or provide data to the power distribution unit 88, the DC/DC converter 84, the first AC/DC converter 90, and the second AC/DC converter 92, among other elements, and based on such data, the switching elements of these devices can perform their respective duty cycles to control the electrical power distribution in the electric propulsion system 50.

As further shown in FIG. 1, the supervisor controller 94 can form a part of a computing system 96 of the aircraft 10.

The computing system 96 of the aircraft 10 can include one or more processors and one or more memory devices embodied in one or more computing devices. For instance, as depicted in FIG. 1, the computing system 96 includes the supervisor controller 94 as well as other computing devices, such as computing device 98 and propulsor controllers 52, 54 associated with the first electric propulsor 60 and the second electric propulsor 70, respectively. The computing devices of the computing system 96 can be communicatively coupled with one another via a communication network. For instance, the computing device 98 located in the cockpit of the aircraft 10, the propulsor controllers 52, 54, and the supervisor controller 94 can be communicatively coupled with one another via one or more communication links of the communication network. The communication links can include one or more wired or wireless communication links.

The supervisor controller 94 and other computing devices of the computing system 96 of the aircraft 10 may be configured in the same or similar manner as the computing devices of the computing system 1200 described below with reference to FIG. 11.

Figure 2:
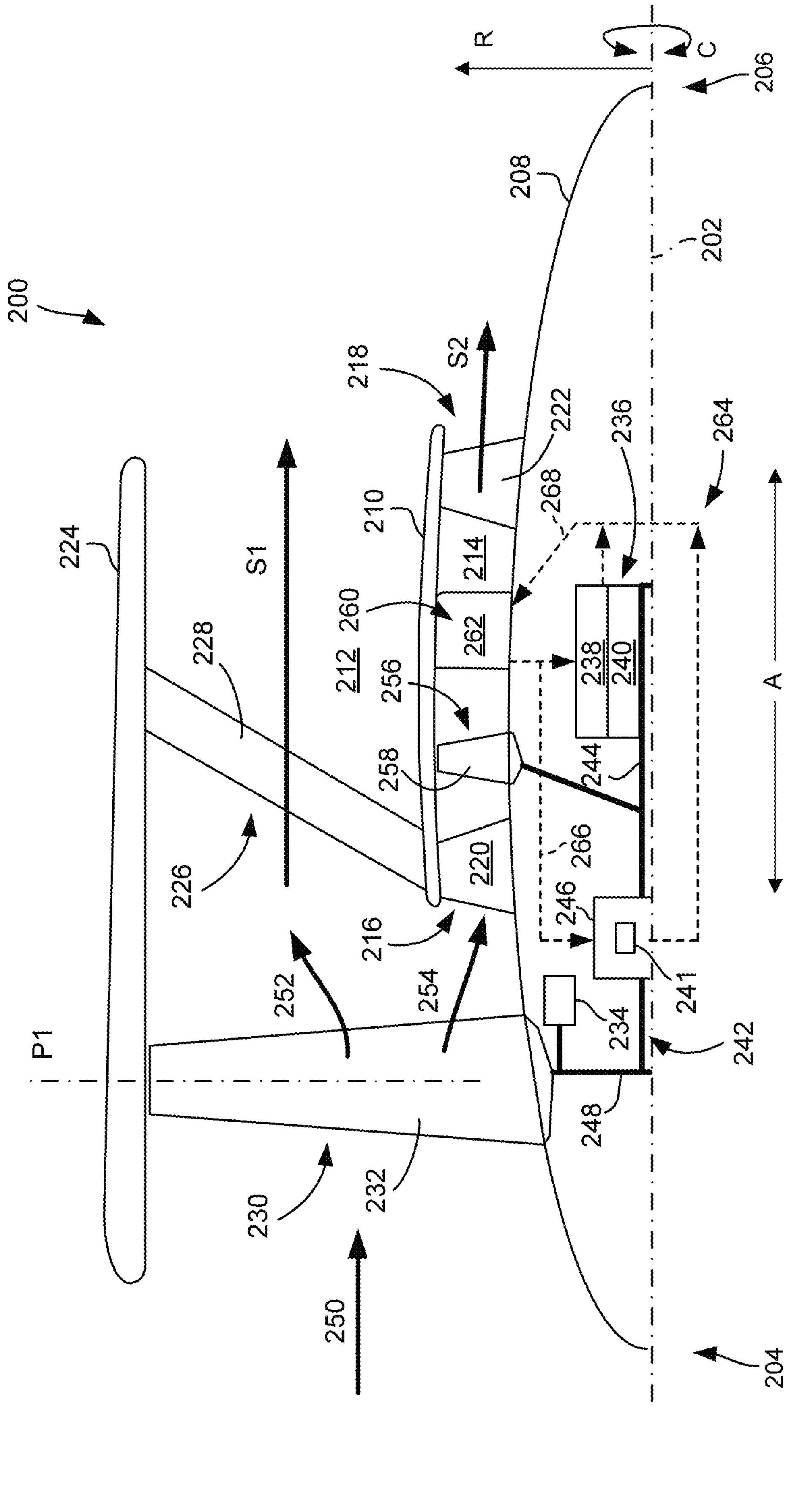
FIGS. 2 through 9 each provide schematic, cross-sectional views of electric propulsors according to example embodiments of the present disclosure.

FIG. 2 provides a schematic, cross-sectional view of a portion of an electric propulsor 200 according to one example embodiment of the present disclosure. The electric propulsor 200 can be implemented in a vehicle, such as the aircraft of FIG. 1. In this regard, one or both of the first and second electric propulsors 60, 70 of FIG. 1 can be configured as the electric propulsor 200 of FIG. 2.

As depicted in FIG. 2, for reference, the electric propulsor 200 defines an axial direction A, a radial direction R, and a circumferential direction C. The electric propulsor 200 also defines a longitudinal centerline 202 extending along the axial direction A. The electric propulsor 200 extends between a forward end 204 and an aft end 206 along the axial direction A.

The electric propulsor 200 has a core cowl 208 and an outer cowl 210. For this embodiment, the outer cowl 210 surrounds the core cowl 208 along the circumferential direction C. A first air flowpath 212 is defined outward of the outer cowl 210 along the radial direction R and a second air flowpath 214 is defined between the core cowl 208 and the outer cowl 210 along the radial direction R. The second air flowpath 214 has an inlet 216 and an outlet 218. The inlet 216 and the outlet 218 can both extend annularly, semi-annularly, or in circumferentially spaced sections, for example. A forward frame 220 and an aft frame 222 extend through the second air flowpath 214 and connect the core cowl 208 and the outer cowl 210. For the depicted embodiment of FIG. 2, the first air flowpath 212 is defined between the outer cowl 210 and an outer nacelle 224. An array 226 of circumferentially-spaced stator vanes 228 (only one stator vane 228 is shown in FIG. 2) extend through the first air flowpath 212 and connect the outer cowl 210 and the outer nacelle 224. The inlet 216, the outlet 218, and the forward and aft frames 220, 222 need not necessarily be circumferentially uniform and may include larger structural support elements that partially block the inlet 216 and the outlet 218 and aerodynamic fairings to minimize the impact of such blockage.

As further shown in FIG. 2, the electric propulsor 200 includes a fan 230 having a plurality of fan blades 232 (only one fan blade 232 is shown in FIG. 2). The plurality of fan blades 232 are rotatable about a fan axis of rotation, which in this example embodiment is coaxial with the longitudinal centerline 202. Further, for this embodiment, the fan blades 232 are each rotatable about respective pitch axes P1 by a pitch change mechanism 234. In this way, the fan 230 is a variable pitch fan. The fan blades 232 can each be pitched or rotated about their respective pitch axes P1 in unison by the pitch change mechanism 234, for example. In other embodiments, the fan blades 232 can be rotatable about a fan axis of rotation but not rotatable about respective pitch axes. Thus, in such embodiments, the fan 230 can be a fixed pitch fan. Further, although the fan 230 is shown as a ducted fan in FIG. 2, the inventive aspects of the present disclosure apply to unducted or open rotor electric propulsors as well.

The electric propulsor 200 also includes one or more electric machines. Particularly, for the depicted embodiment of FIG. 2, the electric propulsor 200 includes an electric machine 236. The electric machine 236 includes a stator 238 and a rotor 240. The stator 238 includes electric current-carrying elements, such as windings or coils. In this manner, electrical power can be transmitted to the electric current-carrying elements, and as will be appreciated, electrical energy can be converted into mechanical energy in a motoring mode or vice versa in a generating mode as the rotor 240 rotates relative to the stator 238. The rotor 240 has rotor components for creating a rotor magnetic field, which couple to the stator magnetic field to enable energy conversion. The rotor components of the rotor 240 can be, without limitation, rotor magnets in case of a permanent magnet synchronous machine, a squirrel cage in case of an induction machine, or a field winding in case of a field wound synchronous machine.

The electric machine 236 can be electrically coupled with a power converter and an electric power source (e.g., as shown in FIG. 1). The electric power source and/or the power converter electrically coupled with the electric machine 236 can be located offboard the electric propulsor 200 (e.g., as shown in FIG. 1) or onboard (e.g., within a cavity of the core cowl 208 and/or the outer cowl 210. In a motoring mode or with the electric machine 236 configured as an electric motor, electrical provided to the electric machine 236 can cause the electric machine 236 to generate a torque output to rotatably drive rotatable components of the electric propulsor 200.

The electric propulsor 200 includes a shaft system 242 having one or more shafts. For the depicted embodiment of FIG. 2, the shaft system 242 includes a first shaft 244 mechanically coupling the electric machine 236 and a gearbox 246. The rotor 240 of the electric machine 236 is mechanically coupled with the first shaft 244, and, in this way, the rotor 240 rotates in unison with the first shaft 244. The shaft system 242 also includes a second shaft 248 mechanically coupling the gearbox 246 and the fan 230. In this regard, the electric machine 236 can rotatably drive the first shaft 244, mechanical power from the first shaft 244 can be transmitted to the gearbox 246, the gearbox 246 can in turn transmit mechanical power to the second shaft 248, and the second shaft 248 can drivingly rotate the fan 230. Accordingly, the electric machine 236 can drivingly rotate the fan 230 to produce thrust. The gearbox 246 can facilitate mechanical power transmission between the electric machine 236, which may operate at a relatively high rotational speed, and the fan blades 232, which may operate at a lower rotational speed relative to the electric machine 236.

As illustrated in FIG. 2, incoming air 250 can flow across the rotating fan blades 232 of the fan 230, and a first portion of air 252 can flow along the first air flowpath 212 to produce a first airstream S1, which produces thrust. A second portion of air 254 flowing downstream of the fan 230 can flow into and along the second air flowpath 214 to produce a second airstream S2, which also produces thrust. Accordingly, the electric propulsor 200 of FIG. 2 is a two-stream electric propulsor. The incoming air 250 can be split into the first portion of air 252 and the second portion of air 254 by a splitter or forward end of the outer cowl 210.

As further shown in FIG. 2, the electric propulsor 200 includes a means for boosting or compressing the second portion of air 254 flowing along the second air flowpath 214. Particularly, for this example embodiment, the electric propulsor 200 includes a booster 256 having one or more stages of airfoils. For the embodiment of FIG. 2, the booster 256 includes a single stage of airfoils 258. In other embodiments, however, the booster 256 can include multiple stages or array of airfoils. The booster 256 having one or more stages of airfoils 258 can provide a means for boosting or compressing the second portion of air 254.

The airfoils 258 of the booster 256 (only one airfoil 258 is shown in FIG. 2) are arranged in a circumferential array and are disposed at least in part in the second air flowpath 214. The airfoils 258 are rotatable about a booster axis of rotation, which is coaxial with the longitudinal centerline 202 in this example embodiment. The airfoils 258 of the booster 256 are mechanically coupled with the electric machine 236. Particularly, the first shaft 244 mechanically couples the electric machine 236 and the plurality of airfoils 258. Accordingly, the electric machine 236 is configured to rotatably drive the airfoils 258 of the booster 256 in addition to the fan blades 232 of the fan 230. Rotation of the airfoils 258 boosts or compresses the second portion of air 254.

The electric propulsor 200 also includes a thermal management system 260. The thermal management system 260 includes one or more heat exchangers disposed at least in part in the second air flowpath 214. As depicted in FIG. 2, the thermal management system 260 includes a heat exchanger 262 disposed within the second air flowpath 214 downstream of the booster 256. The heat exchanger 262 can extend annularly along the circumferential direction C or along only a portion of a circumference of the core cowl 208. Further, for this example embodiment, the heat exchanger 262 is an air-to-oil heat exchanger. In this regard, the second portion of air 254 that has been boosted by the airfoils 258 of the booster 256 can be used to cool oil flowing through the heat exchanger 262. The heat exchanger 262 can be positioned along a cooling circuit 264. The cooled oil can be routed to the electric machine 236 and/or the gearbox 246 for providing cooling thereto via one or more delivery lines 266 of the cooling circuit 264. The relatively hot oil, which has accepted thermal energy or heat from the electric machine 236 and/or the gearbox 246, can then be returned to the heat exchanger 262 via one or more return lines 268 of the cooling circuit 264. Accordingly, the heat exchanger 262 is in thermal communication with the electric machine 236 and the gearbox 246 in this example embodiment. That is, the heat exchanger 262 is in a heat exchange relationship with the electric machine 236 and the gearbox 246.

Notably, the architecture of the electric propulsor 200 provides certain advantages, benefits, and technical effects. For instance, the booster 256 of the electric propulsor 200 may provide a significant increase in driving pressure ratio for the air cooling stream, or second air flowpath 214, with modest increase in stream temperature. The pressurized air stream provided by the booster 256 may enhance the capacity of the heat exchanger 262 to process heat loads. Moreover, the raised pressure ratio enables thrust recovery through a choked nozzle, whereas traditional blowers and ram ducts recover little thrust due to poor mixing and exhaust coefficients at lower pressure ratios. In addition, for electric propulsors with a co-axial integrated fan, such as in the embodiment of FIG. 2, significant packaging and weight advantages may be realized over traditional blowers.

In some embodiments, optionally, the electric propulsor 200 can include a coupler or clutch that can be controlled to mechanically couple the fan 230 with the electric machine 236 or to mechanically decouple the fan 230 from the electric machine 236. For instance, for the depicted embodiment of FIG. 2, the electric propulsor 200 includes a clutch 241 that can be controlled to mechanically couple the fan 230 with the electric machine 236 or to mechanically decouple the fan 230 from the electric machine 236. The clutch 241 is shown as part of the gearbox 246 in the embodiment of FIG. 2, but in other example embodiments, the clutch 241 and the gearbox 246 can be separate components. For embodiments in which the fan 230 and the booster 256 are driven by a common electric machine, such as in the embodiment of FIG. 2, the clutch 241 can advantageously be controlled to decouple the fan 230 from the electric machine 236 in situations where no thrust or minimal thrust is needed but yet cooling of certain components, such as the gearbox 246 and the electric machine 236 is desired.

As one example, when an aircraft to which the electric propulsor 200 has landed, and the aircraft is taxiing or parked, no or minimal thrust may be desired from the fan 230, the primary thrust producer. However, continued cooling of the gearbox 246 and the electric machine 236 may be desired. Accordingly, the clutch 241 can be controlled, e.g., by a controller associated with the electric propulsor 200, to mechanically decouple the fan 230 from the electric machine 236. Mechanically decoupling the fan 230 from the electric machine 236 allows the electric machine 236 to continue driving the booster 256 and the thermal management system 260 to continue cooling the electric machine 236 and the gearbox 246 whilst also ceasing driving operation of the fan 230. In this way, the electric machine 236 and the gearbox 246 can be cooled even when no or minimal thrust is produced by the fan 230. That is, the electric machine 236 and the gearbox 246 can be cooled without turning the fan 230.

Figure 3:
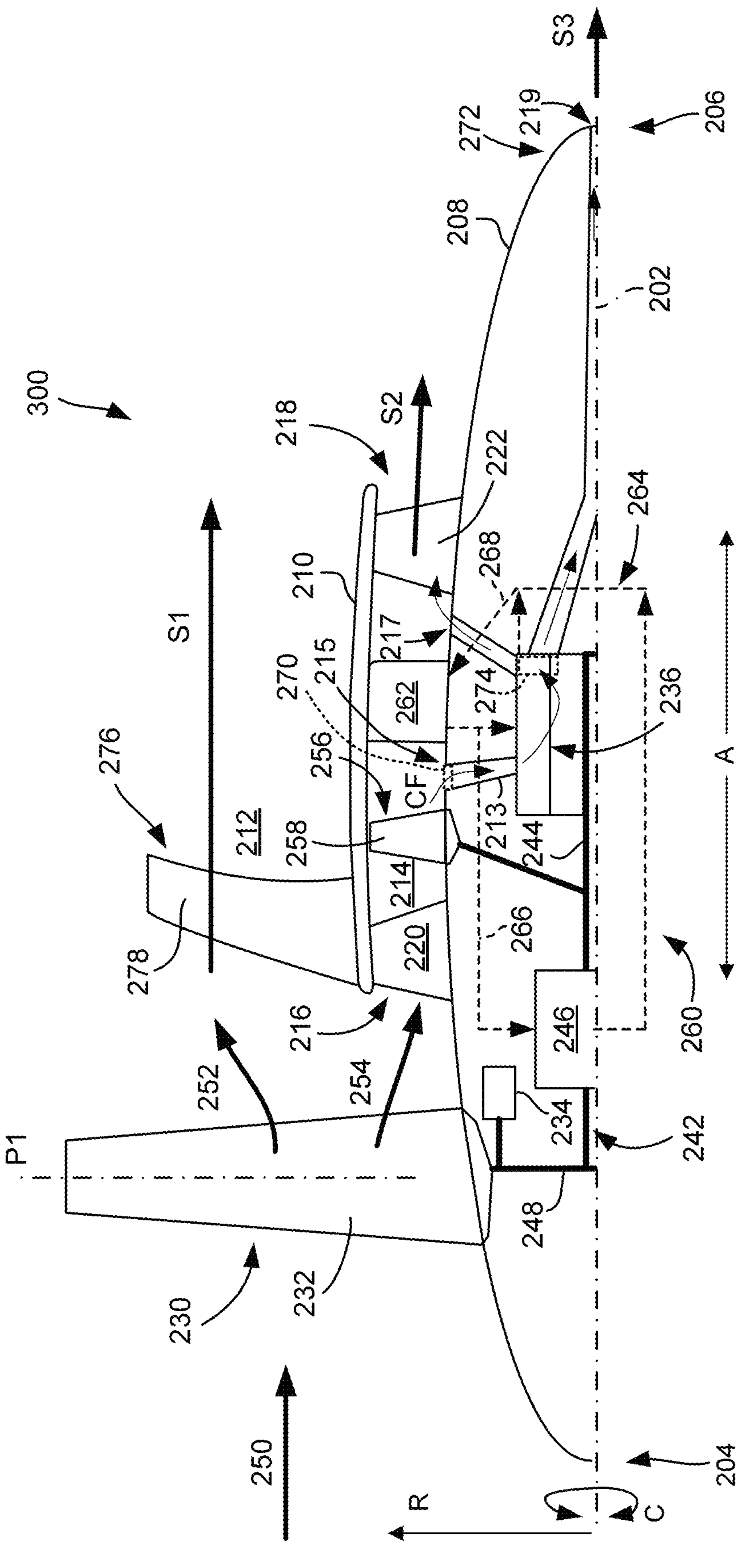

FIG. 3 provides a schematic, cross-sectional view of a portion of an electric propulsor 300 according to one example embodiment of the present disclosure. The electric propulsor 300 can be implemented in a vehicle, such as the aircraft of FIG. 1. In this regard, one or both of the first and second electric propulsors 60, 70 of FIG. 1 can be configured as the electric propulsor 300 of FIG. 3. The electric propulsor 300 of FIG. 3 is configured in a similar manner as the electric propulsor 200 of FIG. 2, and, therefore, like parts will be identified with like numerals with it being understood that the description of the like parts of the electric propulsor 200 applies to the electric propulsor 300 unless otherwise noted.

For the embodiment of FIG. 3, the thermal management system 260 includes air cooling features for cooling the electric machine 236. As shown, the core cowl 208 defines a third air flowpath 213 in flow communication with the second air flowpath 214 downstream of the booster 256. Particularly, an inlet 215 of the third air flowpath 213 is in flow communication with the second air flowpath 214 downstream of the booster 256 and upstream of the heat exchanger 262. The core cowl 208 defines the third air flowpath 213 so as to allow a cooling air to flow to the electric machine 236 of the electric propulsor 300. Optionally, a bleed valve 270 can be positioned within the third air flowpath 213 (e.g., at an inlet of the third air flowpath 213)

to control or meter the cooling flow CF into the third air flowpath 213, e.g., based on the heat load and cooling needs of the electric machine 236.

In some embodiments, an outlet 217 of the third air flowpath 213 is in flow communication with the second air flowpath 214 downstream of the heat exchanger 262. In this way, relatively hot cooling flow CF, which has accepted thermal energy or heat dissipated from the electric machine 236, can be returned to the second air flowpath 214, which may minimize second stream S2 thrust losses. In some alternative embodiments, an outlet 219 of the third air flowpath 213 is defined at a tailcone 272 of the core cowl 208. Accordingly, relatively hot cooling flow CF, which has accepted thermal energy or heat dissipated from the electric machine 236, can be expelled from the tailcone 272 of the electric propulsor 300, which effectively generates a third airstream S3 of thrust. In yet other embodiments, the third air flowpath 213 can have at least two outlets, including outlets 217, 219. In such embodiments, optionally, a metering valve 274 can be controlled to modulate the mass flow of the relatively hot cooling flow CF expelled from the outlets 217, 219. The cooling flow CF expelled from the outlets 217, 219 can be controlled by a controller of the electric propulsor 300, e.g., based on the thrust needs and/or a need to relieve back pressure on the booster 256.

The air cooling features of the electric propulsor 300 can provide redundancy in the cooling methodology for the electric machine 236. That is, the air flowing through the third air flowpath 213 can be used to cool the electric machine 236 in addition to the cooling fluid circulating through the heat exchanger 262 and lines 266, 268. The methodology for cooling the electric machine 236 can be based on, e.g., the operating phase of a flight. For example, during takeoff, the temperature of the air flowing along the second air flowpath 214 might be too high to provide adequate cooling for the electric machine 236 via the third air flowpath 213. Consequently, in such instances, oil cooled by the heat exchanger 262 can be used to cool the electric machine 236. Then, during a cruise phase of flight, the temperature of the air flowing along the second air flowpath 214 may be adequate to cool the electric machine 236 via the third air flowpath 213. Thus, in such instances, the cooling circuit 264 can be deactivated or the oil cooled by the heat exchanger 262 can be cut off from the electric machine 236 and routed only to other components of the electric propulsor 300, such as the gearbox 246. This may enhance the cooling capability of the heat exchanger 262 to process the heat loads of the other components of the electric propulsor 300.

Further, for the depicted embodiment of FIG. 3, the electric propulsor 300 has an open rotor or unducted fan configuration. That is, the fan 230 is not ducted by an outer nacelle as in the embodiment shown in FIG. 2. However, the inventive aspects described above with reference to FIG. 3 apply equally to ducted rotor configurations. For open rotor or unducted fan configurations, the electric propulsor can include an array of circumferentially-spaced fan stator vanes. For instance, for the embodiment of FIG. 3, the electric propulsor 300 includes an array 276 of circumferentially-spaced fan stator vanes 278 (only one fan stator vane 278 is depicted in FIG. 3). The fan stator vanes 278 extend outward from the outer cowl 210 and are fixed in the example embodiment. However, in other embodiments, the fan stator vanes 278 can be variable pitch fan stator vanes that each rotatable about respective pitch axes, e.g., by a pitch change mechanism.

Figure 4:
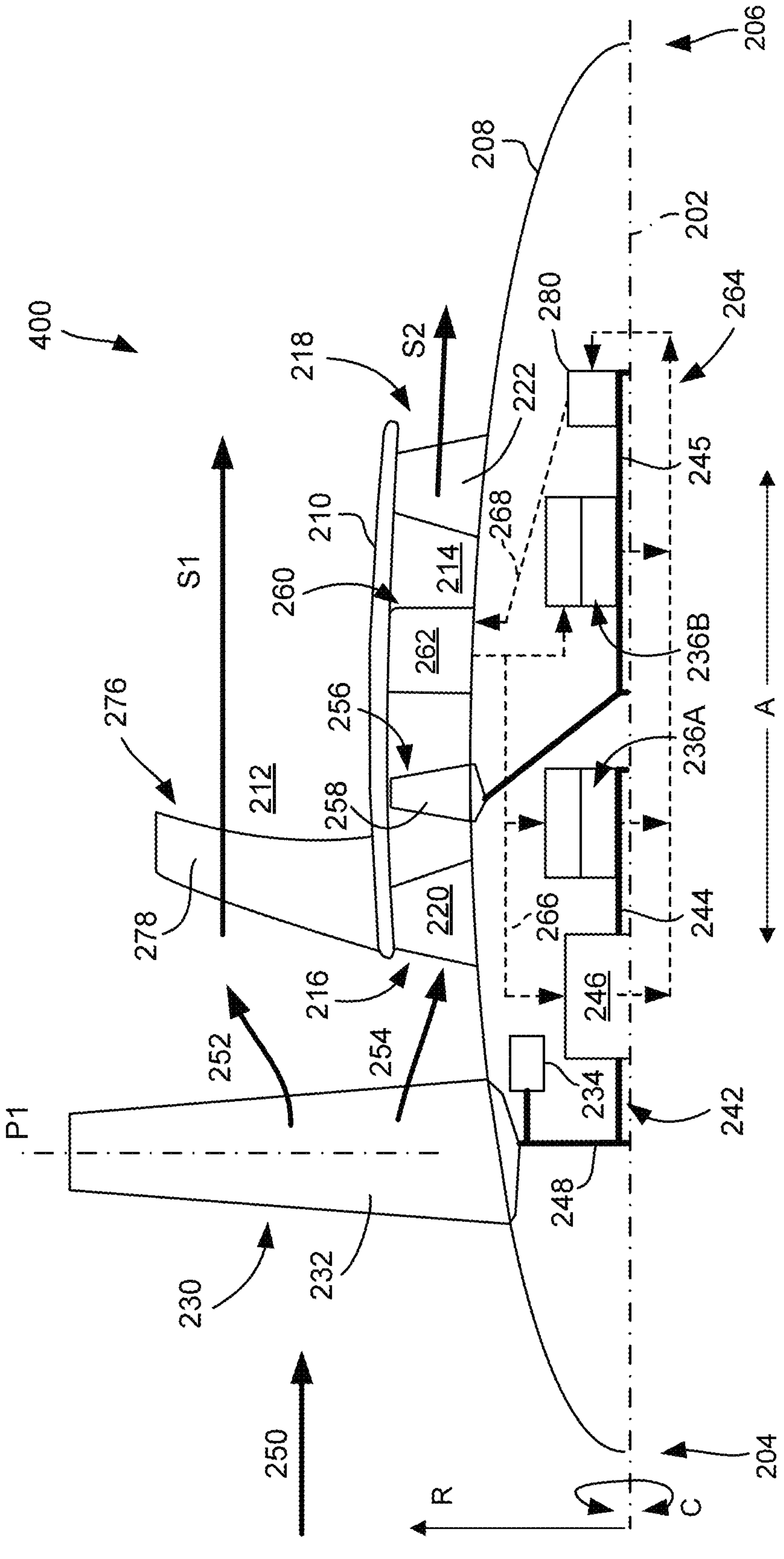

FIG. 4 provides a schematic, cross-sectional view of a portion of an electric propulsor 400 according to one example embodiment of the present disclosure. The electric propulsor 400 can be implemented in a vehicle, such as the aircraft of FIG. 1. In this regard, one or both of the first and second electric propulsors 60, 70 of FIG. 1 can be configured as the electric propulsor 400 of FIG. 4. The electric propulsor 400 of FIG. 4 is configured in a similar manner as the electric propulsor 200 of FIG. 2 and the electric propulsor 300 of FIG. 3, and therefore, like parts will be identified with like numerals with it being understood that the description of the like parts of the electric propulsors 200, 300 applies to the electric propulsor 400 unless otherwise noted.

For the depicted embodiment of FIG. 4, the fan 230 and the booster 256 of the electric propulsor 400 are driven independently of one another. As shown, the fan 230 and the booster 256 are rotatably drivable by separate electric machines. Particularly, the electric propulsor 400 includes a first electric machine 236A mechanically coupled with the plurality of fan blades 232 of the fan 230 for rotatably driving the fan 230 and a second electric machine 236B mechanically coupled with the plurality of airfoils 258 of the booster 256 for rotatably driving the booster 256.

The first shaft 244 of the shaft system 242 mechanically couples the first electric machine 236A and the gearbox 246. Particularly, a rotor of the first electric machine 236A is mechanically coupled with the first shaft 244, and in this way, the rotor of the first electric machine 236A rotates in unison with the first shaft 244. The second shaft 248 of the shaft system 242 mechanically couples the gearbox 246 and the fan 230. In this regard, the first electric machine 236A can rotatably drive the first shaft 244, mechanical power from the first shaft 244 can be transmitted to the gearbox 246, the gearbox 246 can in turn transmit mechanical power to the second shaft 248, and the second shaft 248 can drivingly rotate the fan 230. Accordingly, the first electric machine 236A can rotatably drive the fan 230 to produce thrust.

A third shaft 245 of the shaft system 242 mechanically couples the second electric machine 236B and the plurality of airfoils 258 of the booster 256. That is, a rotor of the second electric machine 236B is mechanically coupled with the third shaft 245, and thus, the rotor of the second electric machine 236B rotates in unison with the third shaft 245. The second electric machine 236B can drivingly rotate the booster 256 to compress the second portion of air flowing along the second air flowpath 214.

As further depicted in FIG. 4, the electric propulsor 400 includes an oil pump 280 positioned along the cooling circuit 264. The oil pump 280 is mechanically coupled with the second electric machine 236B via the third shaft 245. Accordingly, the second electric machine can drive the oil pump 280 so that it moves oil along the along the cooling circuit 264. The heat exchanger 262 is in thermal communication with the first electric machine 236A and the second electric machine 236B, and the oil pump 280 is configured to move the oil along the cooling circuit 264 to enhance delivery of relatively cool oil from the heat exchanger 262 to the first electric machine 236A and the second electric machine 236B and to enhance return of relatively hot oil from the first electric machine 236A and the second electric machine 236B to the heat exchanger 262.

By mechanically coupling the booster 256 and the oil pump 280 with the third shaft 245, which is not mechanically coupled with the fan 230, the cooling capability of the thermal management system 260 is effectively decoupled from the fan 230, which is the primary thrust producer of the electric propulsor 400. This allows for the thermal management system 260 to process heat loads independent of the fan 230, or rather, largely independent of thrust produced. Decoupling the fan 230 from the booster 256 and the oil pump 280 may be particularly advantageous after landing an aircraft to which the electric propulsor 400 is coupled, e.g., during taxiing, as the booster 256, heat exchanger 262, and oil pump 280 can collectively work together to cool the gearbox 246, the first electric machine 236A, and the second electric machine 236B, and the fan 230 can be deactivated or rotated at relatively low speed by the first electric machine 236A, which minimizes thrust and the need for brakes. Further, enhanced cooling capability may be particularly advantageous after landing of an aircraft when heat from the electric machines 236A, 236B and/or the gearbox 246 needs to be removed prior to complete shutdown so as to prevent a soak back condition, which results in the magnetic materials in the electric machines 236A, 236B from exceeding their Curie temperature. If such a condition occurs, a restart of the electric propulsor 400 may not be possible until the electric machines 236A, 236B are cooled off, which may extend turnaround time.

Figure 5:
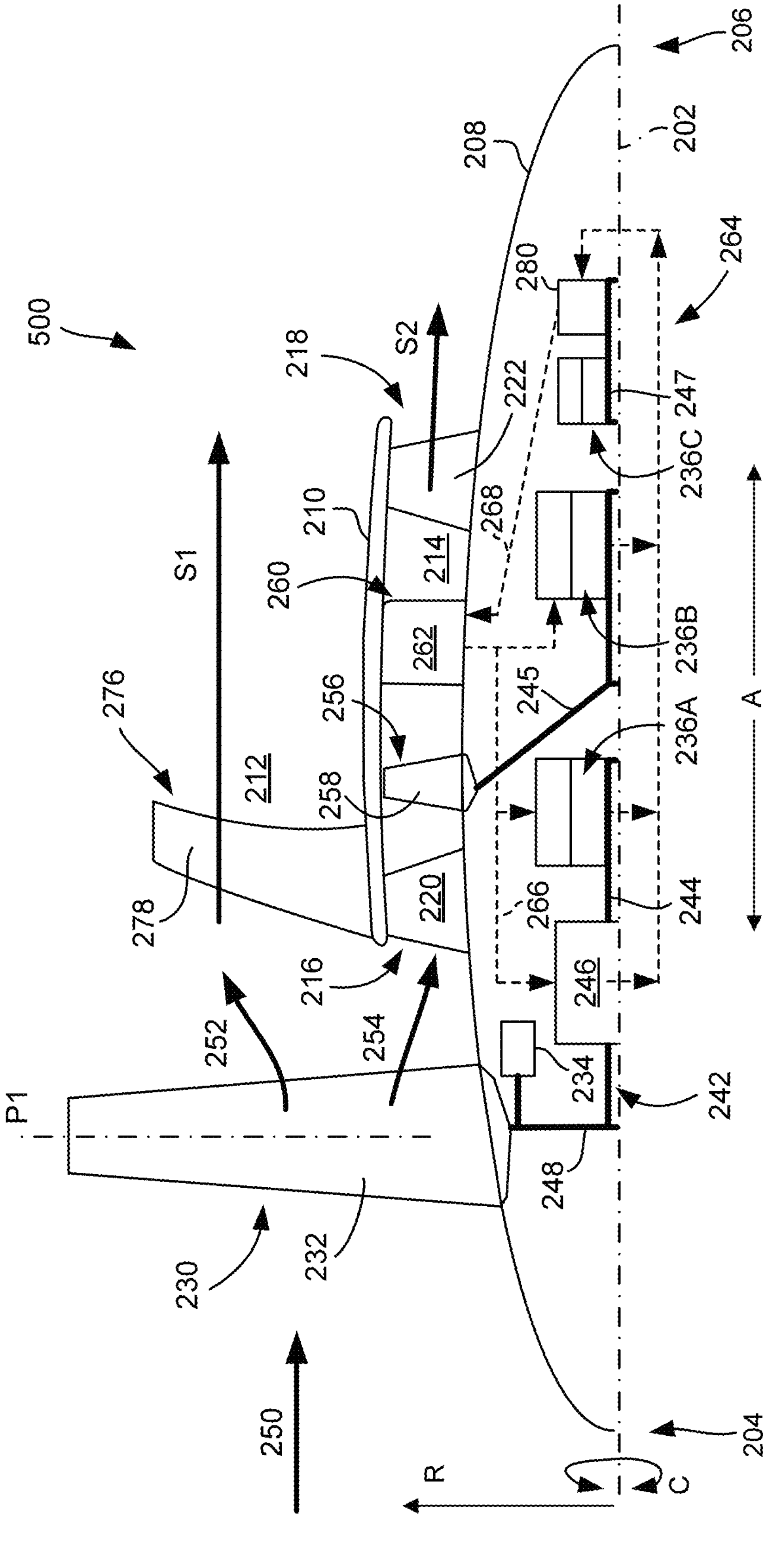

FIG. 5 provides a schematic, cross-sectional view of a portion of an electric propulsor 500 according to one example embodiment of the present disclosure. The electric propulsor 500 can be implemented in a vehicle, such as the aircraft of FIG. 1. In this regard, one or both of the first and second electric propulsors 60, 70 of FIG. 1 can be configured as the electric propulsor 500 of FIG. 5. The electric propulsor 500 of FIG. 5 is configured in a similar manner as the electric propulsor 400 of FIG. 4, and, therefore, like parts will be identified with like numerals with it being understood that the description of the like parts of the electric propulsor 400 applies to the electric propulsor 500 unless otherwise noted.

For the depicted embodiment of FIG. 5, the fan 230, the booster 256, and the oil pump 280 of the electric propulsor 500 are driven independently of one another. As shown, the fan 230, the booster 256, and the oil pump 280 are each drivingly rotated by separate electric machines. Particularly, the first electric machine 236A is mechanically coupled with the plurality of fan blades 232 of the fan 230 for drivingly rotating the fan 230, the second electric machine 236B is mechanically coupled with the plurality of airfoils 258 of the booster 256 for drivingly rotating the booster 256, and a third electric machine 236C is mechanically coupled with the oil pump 280 via a fourth shaft 247 for drivingly rotating the oil pump 280. In this regard, the oil pump 280 is driven independent of the thrust producing elements (e.g., the fan 230 and the booster 256).

Driving the oil pump 280 independently of the fan 230 and booster 256 can provide certain benefits, advantages, and technical effects. For instance, in conventional aviation propulsion systems, at high power, a 1% change in fan speed results in about a 3% change in thrust. As such, a 3% change in fan speed results in about a 10% change in power output. A 10% change in fan speed can be greater than a 30% change in power output. Thus, as discovered by the inventors, separating the propulsion drive (e.g., the fan 230 and the booster 256) from the cooling drive unit (e.g., the oil pump 280) allows for a change in pump speed to correlate with the output power, rather than the fan speed or thrust produced.

Figure 6:
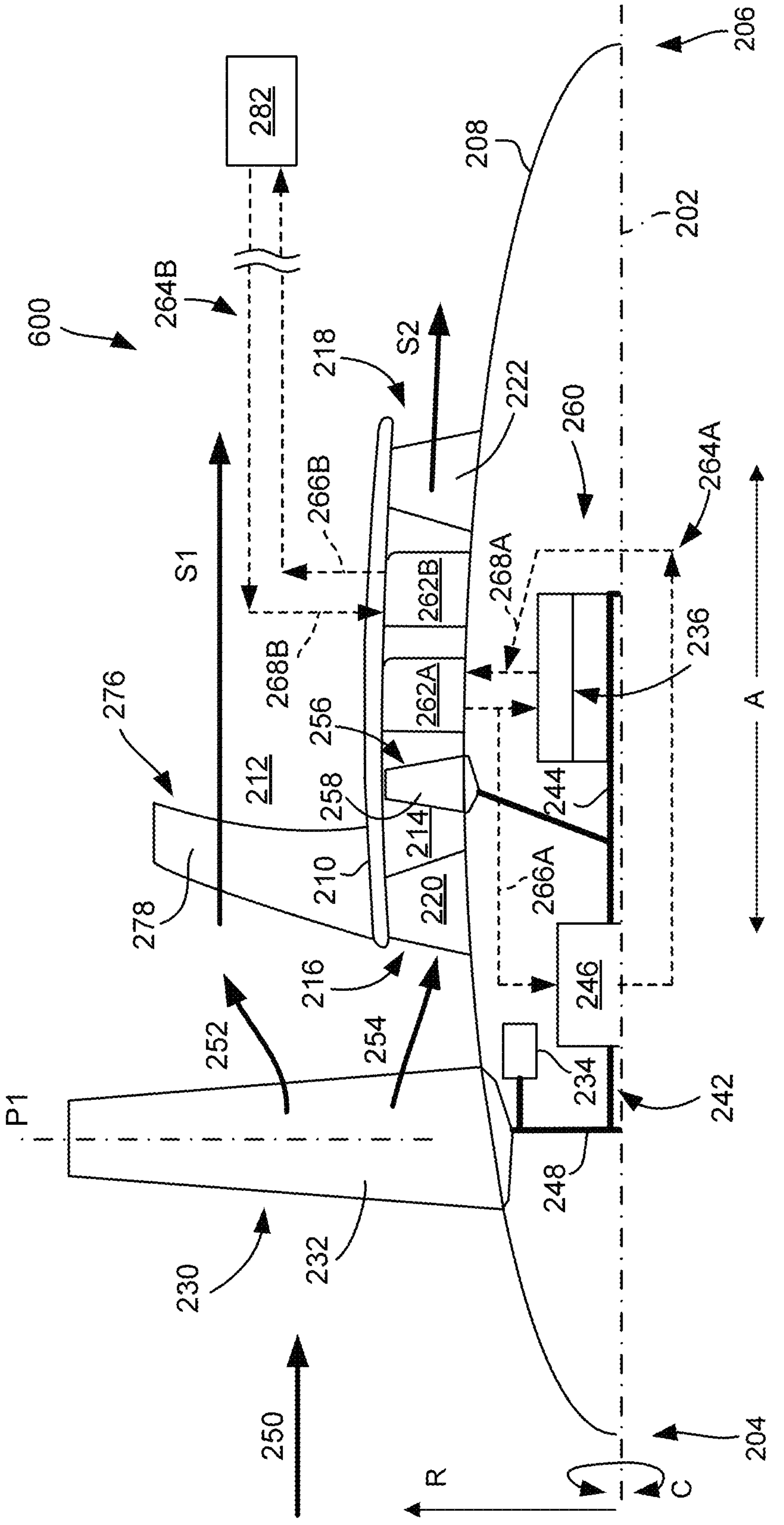

FIG. 6 provides a schematic, cross-sectional view of a portion of an electric propulsor 600 according to one example embodiment of the present disclosure. The electric propulsor 600 can be implemented in a vehicle, such as the aircraft of FIG. 1. In this regard, one or both of the first and second electric propulsors 60, 70 of FIG. 1 can be configured as the electric propulsor 600 of FIG. 6. The electric propulsor 600 of FIG. 6 is configured in a similar manner as the electric propulsor 200 of FIG. 2, and therefore, like parts will be identified with like numerals with it being understood that the description of the like parts of the electric propulsor 200 applies to the electric propulsor 600 unless otherwise noted.

For the depicted embodiment of FIG. 6, the electric propulsor 600 is an unducted or open rotor electric propulsor that includes cooling features for cooling elements onboard the electric propulsor 600 and cooling features for cooling elements offboard the electric propulsor 600, such as one or more aircraft systems. Specifically, as shown in FIG. 6, the electric propulsor 600 includes a first heat exchanger 262A and a second heat exchanger 262B both disposed within the second air flowpath 214 downstream of the booster 256. The first heat exchanger 262A is configured to utilize the second portion of air 254, which has been boosted by the booster 256, to cool oil flowing through a first cooling circuit 264A. The first cooling circuit 264A includes one or more delivery lines 266A and one or more return lines 268A. The first heat exchanger 262A is in thermal communication, via the first cooling circuit 264A, with the at least one electric machine mechanically coupled with the booster 256, which in this example embodiment includes the electric machine 236. The first heat exchanger 262A is also in thermal communication with the gearbox 246 via the first cooling circuit 264A, e.g., for providing cooling thereto.

The second heat exchanger 262B, which is positioned downstream of the first heat exchanger 262A in this example embodiment, is configured to utilize the second portion of air 254, which has been boosted by the booster 256, to cool a cooling fluid flowing through a second cooling circuit 264B so that the cooling fluid can be used to cool one or more offboard systems 282. The second cooling circuit 264B includes one or more delivery lines 266B to deliver relatively cool cooling fluid to the one or more offboard systems 282. Consequently, the second cooling circuit 264B is positioned at least in part offboard the electric propulsor 600. The second cooling circuit 264B also includes one or more return lines 268B that carry relatively hot cooling fluid back to the second heat exchanger 262B to be cooled. In this regard, the second heat exchanger 262B is in thermal communication with at least one offboard system 282. The delivery lines 266B and the return lines 268B can be routed through a pylon that mechanically couples the electric propulsor 600 with an aircraft or other vehicle.

The second heat exchanger 262B and the second cooling circuit 264B may enable efficient cooling of the one or more offboard systems 282 that may have otherwise required additional aircraft cooling systems, which may enable a total aircraft weight savings and may provide additional space onboard the aircraft.

Figure 7:
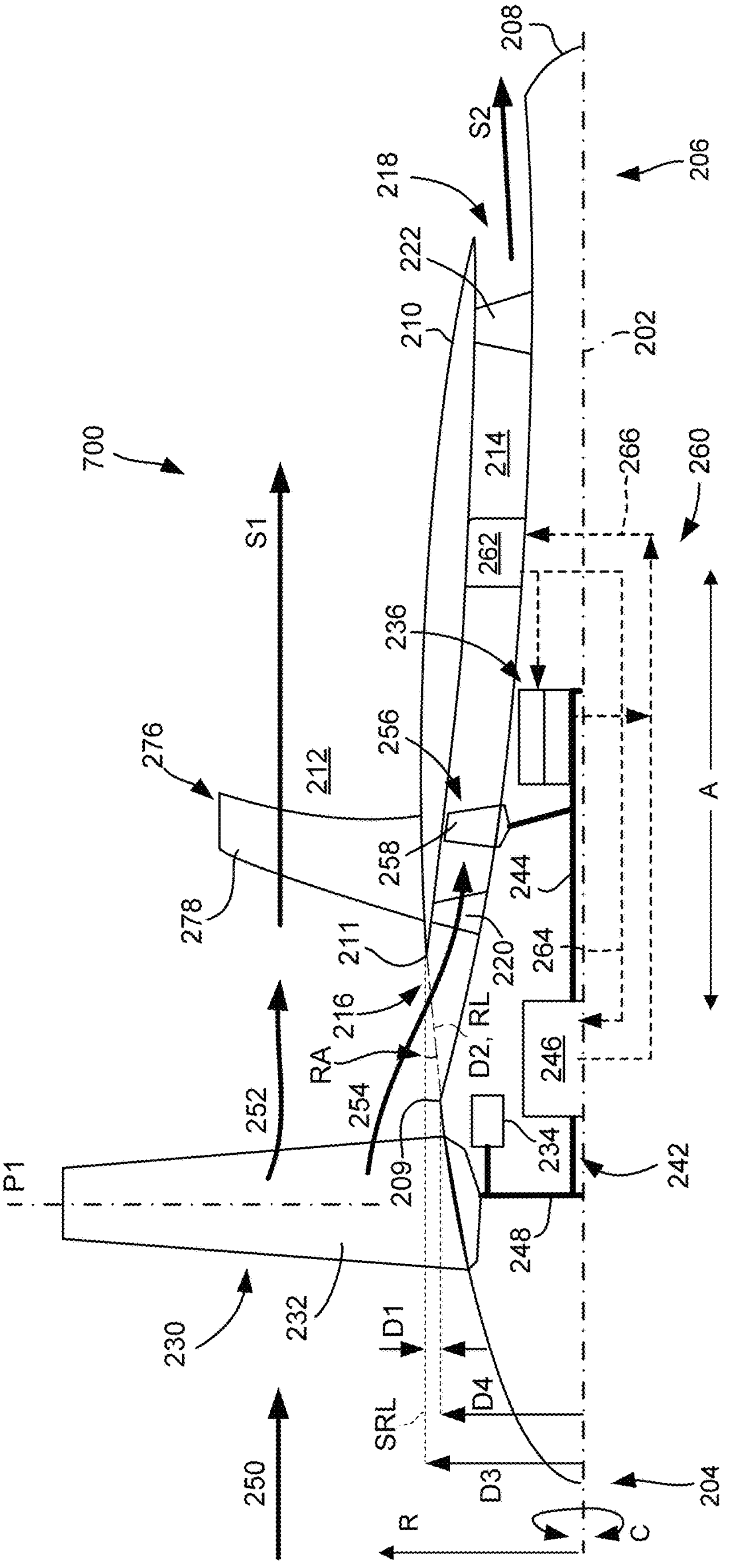

FIG. 7 provides a schematic, cross-sectional view of a portion of an electric propulsor 700 according to one example embodiment of the present disclosure. The electric propulsor 700 can be implemented in a vehicle, such as the aircraft of FIG. 1. In this regard, one or both of the first and second electric propulsors 60, 70 of FIG. 1 can be configured as the electric propulsor 700 of FIG. 7. The electric propulsor 700 of FIG. 7 is configured in a similar manner as the electric propulsor 200 of FIG. 2, and, therefore, like parts will be identified with like numerals with it being understood that the description of the like parts of the electric propulsor 200 applies to the electric propulsor 700 unless otherwise noted.

For the depicted embodiment of FIG. 7, the electric propulsor 700 is an unducted or open rotor electric propulsor that has a protected core inlet. Specifically, as shown in FIG. 7, the outer cowl 210 has a splitter nose 211 and the core cowl 208 defines a tangent point 209. The tangent point 209 is defined as a furthest radial outward point of the core cowl 208 that is aft of the fan 230 and forward of the splitter nose 211 along the axial direction A.

The splitter nose 211 and the tangent point 209 define the inlet 216 of the second air flowpath 214, which is a protected inlet in the embodiment of FIG. 7. The second portion of air 254 can enter the second air flowpath 214 through the inlet 216 as illustrated in FIG. 7. The inlet 216 is a protected inlet in that a radial capture distance D1 of the inlet 216 is at least seventy-five percent (75%) less than an inlet distance D2 spanning from the splitter nose 211 to the tangent point 209. For instance, as shown in FIG. 7, the radial capture distance D1 of the inlet 216 is at least seventy-five percent (75%) less than the inlet distance D2 spanning from the splitter nose 211 to the tangent point 209. The radial capture distance D1 is defined as a difference between a radial distance D3 spanning between the splitter nose and a longitudinal centerline 202 of the electric propulsor 700 and a radial distance D4 spanning between the tangent point 209 and the longitudinal centerline 102. In other embodiments, the inlet 216 is arranged so that a reference line RL spanning from the from the splitter nose 211 to the tangent point 209 is equal to or at least within a reference angle RA of a splitter reference line SRL that extends axially outward from the splitter nose 211 parallel to the longitudinal centerline 202. In some embodiments, the reference angle RA is equal to or less than thirty degrees (30°).

The relatively small capture area of the inlet of the second air flowpath 214, or the inlet 216, may protect components disposed along the second air flowpath 214 from Foreign Object Debris (FOD) compared to conventional architectures. This may, for example, extend the useful service life of the airfoils 258 of the booster 256 and/or the heat exchanger 262.

Figure 8:
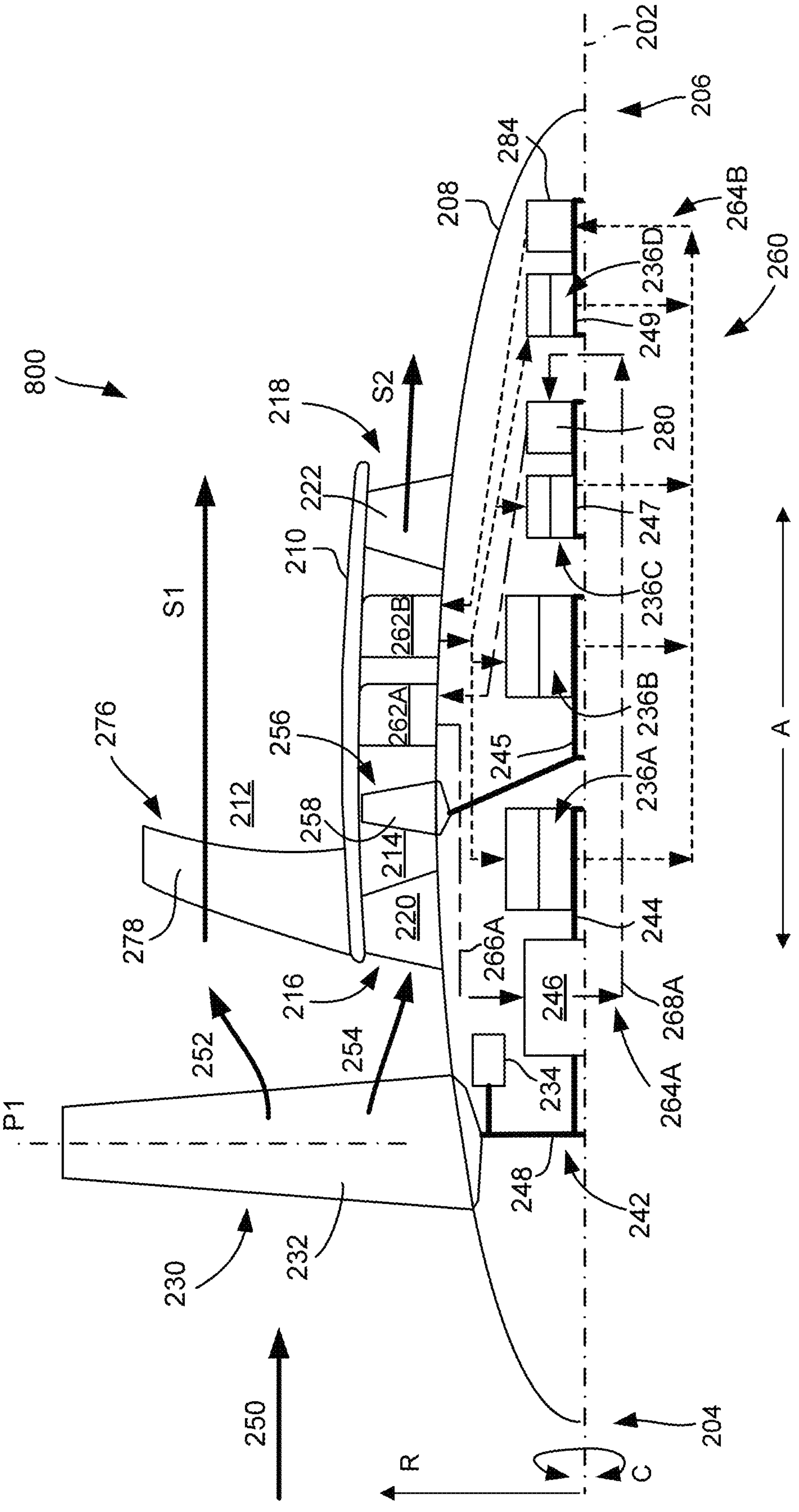

FIG. 8 provides a schematic, cross-sectional view of a portion of an electric propulsor 800 according to one example embodiment of the present disclosure. The electric propulsor 800 can be implemented in a vehicle, such as the aircraft of FIG. 1. In this regard, one or both of the first and second electric propulsors 60, 70 of FIG. 1 can be configured as the electric propulsor 800 of FIG. 8. The electric propulsor 800 of FIG. 8 is configured in a similar manner as the electric propulsor 500 of FIG. 5, and therefore, like parts will be identified with like numerals with it being understood that the description of the like parts of the electric propulsor 500 applies to the electric propulsor 800 unless otherwise noted.

For the depicted embodiment of FIG. 8, the electric propulsor 800 is an unducted or open rotor electric propulsor that includes two onboard cooling circuits, including a first cooling circuit 264A for providing cooling to the gearbox 246 and a second cooling circuit 264B for providing cooling to the electric machines driving the various rotatable components of the electric propulsor 800.

As shown in FIG. 8, the first cooling circuit 264A includes a first heat exchanger 262A disposed within the second air flowpath 214 downstream of the booster 256. One or more delivery lines 266A of a first cooling circuit 264A fluidly couple the first heat exchanger 262A and the gearbox 246. In this way, oil cooled at the first heat exchanger 262A by the boosted second portion of air 254 can be provided to the gearbox 246 for cooling. Thus, the first heat exchanger 262A is in thermal communication with the gearbox 246. One or more return lines 268A of the first cooling circuit 264A fluidly couple the gearbox 246 and the oil pump 280 as well as the oil pump 280 and the first heat exchanger 262A. The oil pump 280 moves oil along the first cooling circuit 264A. Accordingly, relatively hot oil, or oil that has accepted thermal energy from the gearbox 246, can be returned to the first heat exchanger 262A to be cooled.

The fan 230 and the oil pump 280 are driven independently of one another. Specifically, the fan 230 is driven by a first electric machine 236A and the oil pump 280 is driven by a third electric machine 236C. The first electric machine 236A is mechanically coupled with the fan 230 via the first shaft 244, the gearbox 246, and the second shaft 248. The third electric machine 236C is mechanically coupled with the oil pump 280 via the fourth shaft 247. In this regard, the oil pump 280 is driven independent of the fan 230, which allows the oil pump 280 to continue circulating oil along the first cooling circuit 264A independent of the thrust output of the fan 230 and other thrust producing elements of the electric propulsor 800.

The second cooling circuit 264B includes a second heat exchanger 262B disposed within the second air flowpath 214 downstream of the booster 256, and in this example embodiment, downstream of the first heat exchanger 262A. One or more delivery lines 266B of the second cooling circuit 264B fluidly couple the second heat exchanger 262B and the electric machines of the electric propulsor 800, including the first electric machine 236A that drives the fan 230, the second electric machine 236B that drives the booster 256, the third electric machine 236C that drives the oil pump 280, and a fourth electric machine 236D that drives a fluid pump 284 that circulates a cooling fluid along the second cooling circuit 264B. In this way, fluid cooled at the second heat exchanger 262B by the boosted second portion of air 254 can be provided to the first, second, third, and fourth electric machines 236A, 236B, 236C, 236D for cooling. Thus, the second heat exchanger 262B is in thermal communication with the first, second, third, and fourth electric machines 236A, 236B, 236C, 236D. One or more return lines 268B of the second cooling circuit 264B fluidly couple the first, second, third, and fourth electric machines 236A, 236B, 236C, 236D and the fluid pump 284 as well as the fluid pump 284 and the second heat exchanger 262B. The fluid pump 284 moves a cooling fluid along the second cooling circuit 264B. Accordingly, relatively hot oil, or oil that has accepted thermal energy from the first, second, third, and fourth electric machines 236A, 236B, 236C, 236D, can be returned to the second heat exchanger 262B to be cooled.

The booster 256 and the fluid pump 284 are driven independently of one another, and for this embodiment, the fan 230, the booster 256, the oil pump, and the fluid pump 284 are driven independently of one another. More specifically, the fan 230 is driven by the first electric machine 236A, the booster 256 is driven by the second electric machine 236B, the oil pump 280 is driven by the third electric machine 236C, and the fluid pump 284 is driven by the fourth electric machine 236D. The second electric machine 236B is mechanically coupled with the booster 256 via the third shaft 245. The fourth electric machine 236D is mechanically coupled with the fluid pump 284 via a fifth shaft 249. In this regard, the fluid pump 284 is driven independent of the fan 230 and the booster 256, which allows the fluid pump 284 to continue circulating cooling fluid along the second cooling circuit 264B independent of the thrust output of the fan 230 and the booster 256. As the fluid pump 284 is also driven independently of the oil pump 280 of the first cooling circuit 264A, the fluid pump 284 can be driven according to the cooling needs of the first, second, third, and fourth electric machines 236A, 236B, 236C, 236D without or with minimal consideration for the cooling needs of the gearbox 246.

The architecture of the electric propulsor 800 of FIG. 8 enables separation of the oil for the gearbox 246 and the cooling fluid for the first, second, third, and fourth electric machines 236A, 236B, 236C, 236D. This separation enables the use of cooling fluids other than oil to cool the first, second, third, and fourth electric machines 236A, 236B, 236C, 236D. In some example embodiments, the cooling fluid flowing along the second cooling circuit 264B can be a refrigerant. In this regard, the second cooling circuit 264B can be a full refrigeration cycle system. Such a refrigeration cycle system can include components to support a phase change fluid system, including a compressor, condenser, expansion device, and an evaporator. In other example embodiments, the second cooling circuit 264B can be a cryogenic cooling system. In this regard, the cooling fluid flowing along the second cooling circuit 264B can be a cryogenic coolant, such as liquid nitrogen, liquid carbon dioxide, supercritical carbon dioxide, and/or liquid hydrogen.

Moreover, driving both the oil pump 280 and the fluid pump 284 independently of the thrust producing elements of the electric propulsor 800 may provide certain benefits, advantages, and technical effects. Separating the propulsion drive (e.g., the fan 230 and the booster 256) from the cooling drive units (e.g., the oil pump 280 and the fluid pump 284) allows for a change in pump speed to correlate with the pump output power of a given pump, rather than the fan or booster speed, or more generally, thrust produced.

Figure 9:
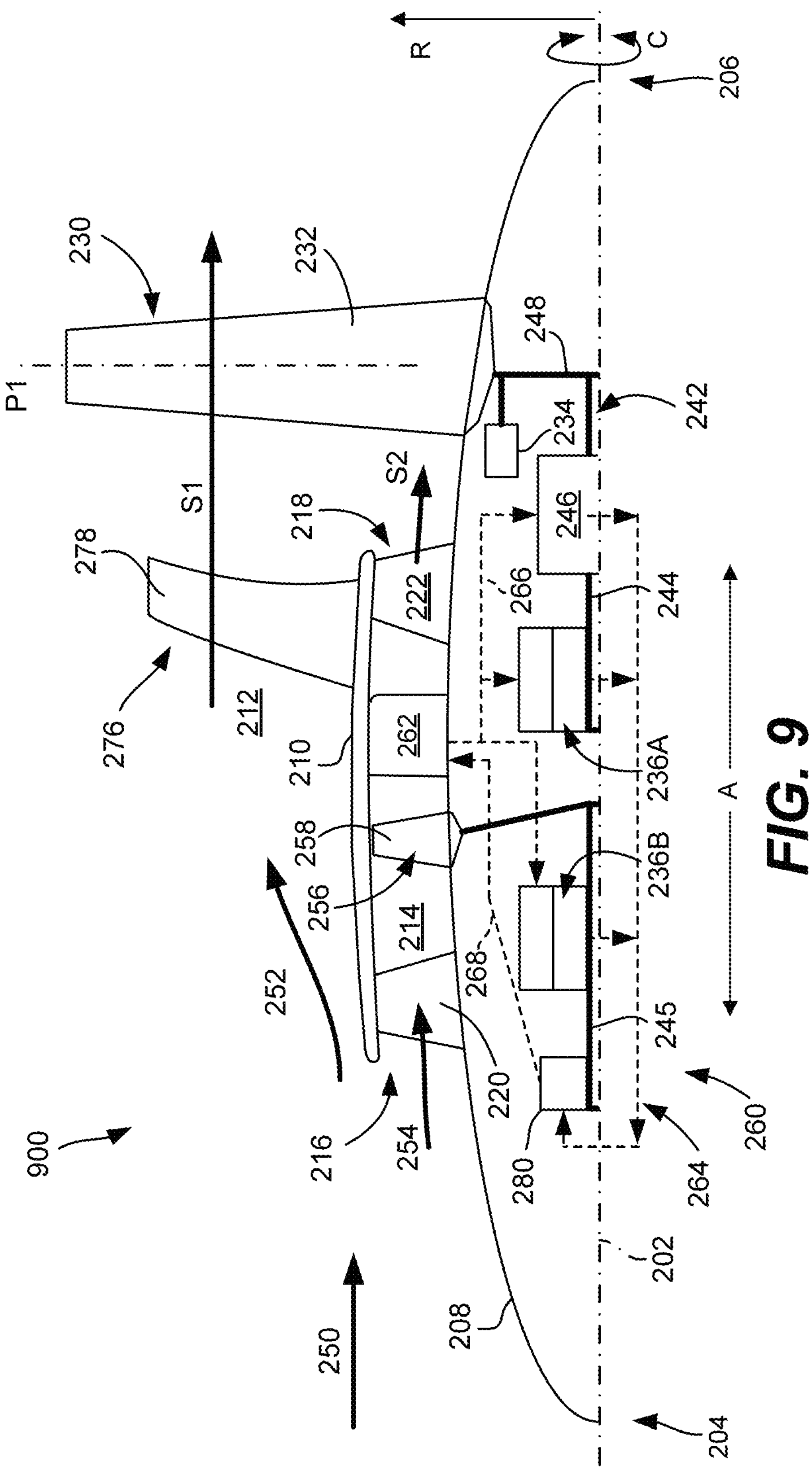

FIG. 9 provides a schematic, cross-sectional view of a portion of an electric propulsor 900 according to one example embodiment of the present disclosure. The electric propulsor 900 can be implemented in a vehicle, such as the aircraft of FIG. 1. In this regard, one or both of the first and second electric propulsors 60, 70 of FIG. 1 can be configured as the electric propulsor 900 of FIG. 9. The electric propulsor 900 of FIG. 9 is configured in a similar manner as the electric propulsor 400 of FIG. 4, and therefore, like parts will be identified with like numerals with it being understood that the description of the like parts of the electric propulsor 400 applies to the electric propulsor 900 unless otherwise noted.

For the depicted embodiment of FIG. 9, the electric propulsor 900 is an unducted or open rotor electric propulsor arranged in a pusher configuration. That is, instead of the fan 230 being positioned at or near the forward end 204 (as in a tractor or puller configuration, such as in the embodiment of FIG. 4), the fan 230 is positioned at or near the aft end 206 for the electric propulsor 900 of FIG. 9. Indeed, for this embodiment, the fan 230 is positioned downstream of the outlet 218 of the second air flowpath 214 (whereas in FIG. 4, the fan 230 is positioned upstream of the inlet 216). Stated another way, in FIG. 9, the fan 230 is positioned downstream of the booster 256 (whereas in FIG. 4, the fan 230 is positioned upstream of the booster 256).

In this manner, the second portion of air 254 directly enters the inlet 216 of the second air flowpath 214 without passing across fan blades, becomes pressurized by the booster 256 and provides cooling to the oil passing through the heat exchanger 262, and then exits the second air flowpath 214 through the outlet 218. The second portion of air 254 exiting the second air flowpath 214 passes across the fan blades 232 of the fan 230 and produces thrust. The first portion of air 252 flowing along the first air flowpath 212 also passes across the fan blades 232 of the fan 230 to produce a majority of the thrust.

The pusher architecture of the electric propulsor 900 of FIG. 9 may provide certain advantages, benefits, and technical effects. For instance, the electric propulsor 900 can be mounted to a wing of an aircraft such that the fan 230 is positioned aft of the trailing edge of the wing. Accordingly, the wing would not be exposed to the swirling and turbulent streams caused by a fan or propeller positioned upstream of the leading edge of the wing. Moreover, the electric propulsor 900 may offer noise reduction, particularly for smaller passenger aircraft.

It will be appreciated that the inventive aspects disclosed in the embodiments depicted in FIGS. 2 through 9 can be applied to other electric propulsors having different configurations and that some inventive aspects can be combinable with one another. For instance, that one, some, or all of the inventive aspects of the embodiments of FIG. 3, FIG. 6, FIG. 7, and FIG. 9 can be combined or included in a single embodiment or any of the other embodiments depicted in FIG. 2, FIG. 4, FIG. 5, and FIG. 8.

Further, although the electric propulsors 200, 300, 400, 500, 600, 700, 800, and 900 of FIGS. 2, 3, 4, 5, 6, 7, 8, and 9 were disclosed above as each being able to be incorporated into a fully-electric propulsion system, such as the propulsion system 50 of the aircraft of FIG. 1, the electric propulsors disclosed herein may also be incorporated into other types of propulsion systems, such as hybrid-electric propulsion systems. Such a hybrid-electric propulsion system can include at least one electric propulsor disclosed herein and at least one heat engine propulsor.

In some embodiments, for example, the heat engine propulsor can be a gas turbine engine powered propulsor. In other embodiments, the heat engine propulsor can be an internal combustion engine propulsor, e.g., a piston driven engine with a propeller. In yet other embodiments, the heat engine propulsor can be a gas turbine engine powered propulsor that includes an electric machine mechanically coupled to a spool of the gas turbine engine. The gas turbine engine can drive the electric machine to cause the electric machine to generate electric power. The generated electric power can be transmitted to one or more aircraft systems, an energy storage device, and/or directly to one or more electric machines of an electric propulsor disclosed herein.

Figure 10:
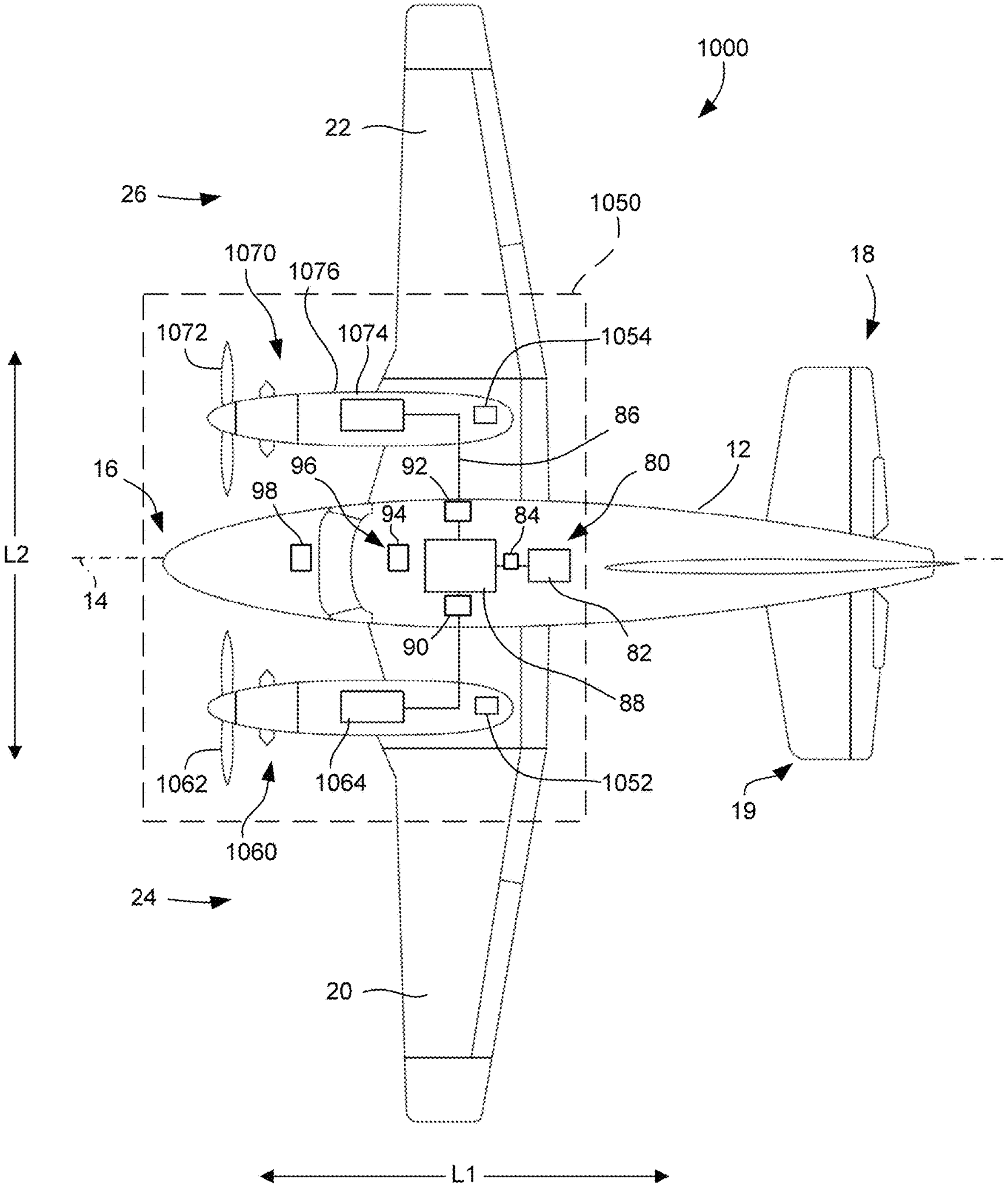
FIG. 10 is a schematic top view of an aircraft having a hybrid-electric propulsion system in accordance with example aspects of the present disclosure.

By way of example, FIG. 10 provides a schematic top view of an aircraft 1000 in accordance with an example aspect of the present disclosure. The aircraft 1000 of FIG. 10 is configured in a similar manner as the aircraft 10 of FIG. 1, except as provided below. In this example embodiment, the propulsion system is a hybrid-electric propulsion system 1050 that includes an electric propulsor 1060 and a heat engine propulsor 1070. The electric propulsor 1060 can be any of the electric propulsors disclosed herein. The heat engine propulsor 1070 includes a propeller or fan 1072 that is driven by a heat engine 1076, which can be a gas turbine engine (e.g., a turboprop) or a piston driven engine, for example. An electric machine 1074 is mechanically coupled with the heat engine 1076, e.g., to a shaft thereof. The heat engine propulsor 1070 is controlled by an engine controller 1054. The electric propulsor 1060 is controlled by an engine controller 1052.

In some modes of operation, the heat engine 1076 can drive the electric machine 1074 to cause the electric machine 1074 to generate electric power. The electric power generated by the electric machine 1074 can be provided to one or more aircraft systems, to the battery 82 of the electric energy storage system 80, and/or directly to an electric machine 1064 that drives a fan 1062 of the electric propulsor 1060, for example. In other modes of operation, electric power stored by the battery 82 can be provided to the electric machine 1064 and to the electric machine 1074 to drive the fan 1062 and the heat engine 1076, respectively. In yet other modes of operation, the fan 1062 can windmill using ram air so that the electric machine 1064 generates electric power. The electric power generated by the electric machine 1064 can be provided to one or more aircraft systems, to the battery 82 of the electric energy storage system 80, and/or directly to the electric machine 1074, e.g., for a power assist. Other modes of operation are also possible.

Figure 11:
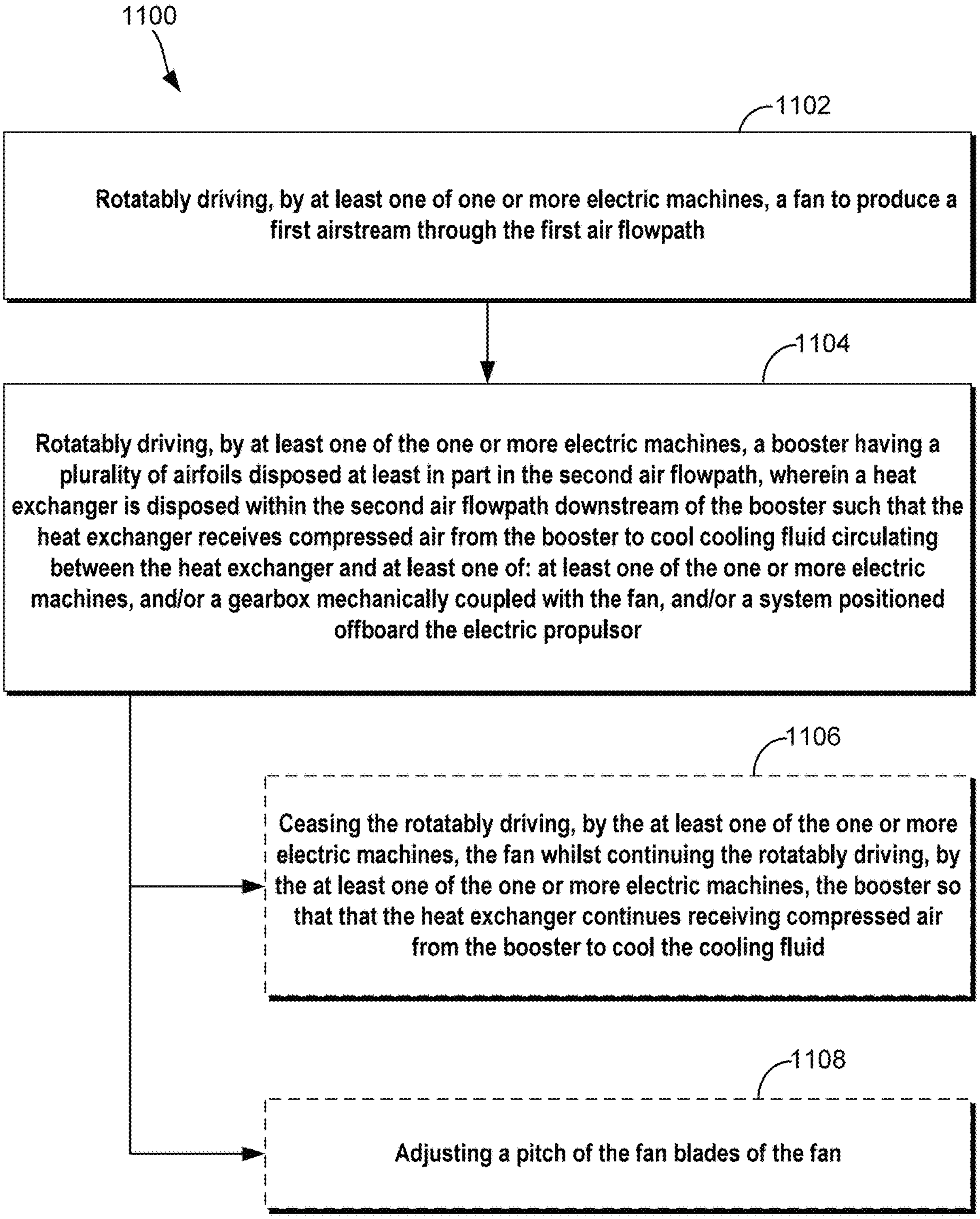
FIG. 11 is a flow diagram of a method of operating an electric propulsor in accordance with an example aspect of the present disclosure.

FIG. 11 provides a flow diagram of a method 1100 of operating an electric propulsor, such as an electric propulsor for an aircraft or other vehicle. The electric propulsor has a core cowl and an outer cowl. A first air flowpath is defined outward of the outer cowl and a second air flowpath is defined between the core cowl and the outer cowl.

At 1102, the method 1100 includes rotatably driving, by at least one of one or more electric machines, a fan to produce a first airstream through the first air flowpath.

At 1104, the method 1100 includes rotatably driving, by at least one of the one or more electric machines, a booster having a plurality of airfoils disposed at least in part in the second air flowpath, wherein a heat exchanger is disposed within the second air flowpath downstream of the booster such that the heat exchanger receives compressed air from the booster to cool cooling fluid circulating between the heat exchanger and at least one of: at least one of the one or more electric machines, and/or a gearbox mechanically coupled with the fan, and/or a system positioned offboard the electric propulsor. In some implementations, the cooling fluid circulates between the heat exchanger and the at least one of the one or more electric machines and between the heat exchanger and the gearbox. In some implementations, the cooling fluid circulates between the heat exchanger and only the system positioned offboard the electric propulsor.

In some implementations, the fan and the booster are rotatably drivable by the same electric machine. In some other implementations, the fan and the booster are rotatably drivable by separate electric machines. In yet other implementations, the electric propulsor includes a pump for driving the cooling fluid along a cooling circuit that provides thermal communication between the heat exchanger and at least one of: the at least one of the one or more electric machines, and/or the gearbox, and/or the system positioned offboard the electric propulsor, and wherein the fan, the booster, and the pump are rotatably drivable by separate electric machines. In some further implementations, the electric propulsor includes a pump for driving the cooling fluid along a cooling circuit that provides thermal communication between the heat exchanger and at least one of: the at least one of the one or more electric machines, and/or the gearbox, and/or the system positioned offboard the electric propulsor, and wherein the booster and the pump are rotatably drivable by a same electric machine while the fan is driven by a separate electric machine.

In some implementations, the heat exchanger is a first heat exchanger and the electric propulsor includes a second heat exchanger disposed within the second air flowpath downstream of the booster. In such implementations, the first heat exchanger is associated with a first cooling circuit and the second heat exchanger is associated with a second cooling circuit. The first and second cooling circuits are fluidly separate from one another. Each cooling circuit includes a pump. The pump of the first cooling circuit and the pump of the second cooling circuit are driven by separate electric machines, neither of the separate electric machines being arranged to drive the fan or the booster.

In some implementations, the electric propulsor is configured as an unducted or open rotor electric propulsor. In some other implementations, the electric propulsor is configured as a ducted fan electric propulsor. In yet other implementations, the electric propulsor is configured in a pusher configuration where the fan is positioned downstream of the second air flowpath. In some further implementations, the electric propulsor is configured in a tractor or puller configuration where the fan is positioned upstream of the second air flowpath.

In some further implementations, the core cowl defines a third air flowpath in flow communication with the second air flowpath downstream of the booster, the third air flowpath being defined so as to allow air flow to the one or more electric machines. In some implementations, an outlet of the third air flowpath is in flow communication with the second air flowpath downstream of the heat exchanger. In yet other implementations, an outlet of the third air flowpath is defined at a tailcone of the core cowl. In some other implementations, the method 1100 includes controlling a metering valve positioned along the third air flowpath at or downstream of the one or more electric machines, the metering valve being controllable to modulate air flow exiting: i) an outlet of the third air flowpath defined in flow communication with the second air flowpath downstream of the heat exchanger; and ii) an outlet of the third air flowpath defined at a tailcone of the core cowl.

In some further implementations, the electric propulsor is mounted to an aircraft and the fan is the primary thrust producer of the electric propulsor, or stated differently, the fan is configured to produce more thrust than any other thrust producing element of the electric propulsor. In such implementations, optionally, at 1106, the method 1100 includes ceasing the rotatably driving, by the at least one of the one or more electric machines, the fan whilst continuing the rotatably driving, by the at least one of the one or more electric machines, the booster so that that the heat exchanger continues receiving compressed air from the booster to cool the cooling fluid circulating between the heat exchanger and at least one of: the at least one of the one or more electric machines, and/or the gearbox mechanically coupled with the fan, and/or the system positioned offboard the electric propulsor. A pump that moves the cooling fluid can also continue to be driven by the one or more electric machines. In this regard, the primary thrust producer, the fan, is no longer rotatably driven while enhanced cooling operations with use of the booster can continue. As one example, ceasing the rotatably driving of the fan at 1106 can be in response to the aircraft being in a low thrust ground condition, such as being parked or in a taxiing operation, e.g., after landing.

In implementations in which the fan and the booster are rotatably driven by separate electric machines (e.g., as shown in FIG. 4), at 1106, the electric machine that is configured to drive the fan can be deactivated or caused to cease producing a torque output. For instance, a power converter electrically coupled with the electric machine configured to drive the fan can cease providing electric power to the electric machine to cease driving of the fan. In contrast, a power converter electrically coupled with the electric machine configured to drive the booster can continue supplying electric power to the electric machine to drive the booster.

In implementations in which the fan and the booster are rotatably driven by the same or a common electric machine (e.g., as shown in FIG. 2), a coupler or clutch can be activated to mechanically decouple the fan from the electric machine so that the electric machine can rotatably drive the booster without rotatably driving the fan. As one example, the clutch can be controlled to mechanically decouple the fan from the electric machine in response to the aircraft being in a low thrust ground condition, such as being parked or in a taxiing operation. As noted, this advantageously allows for enhanced cooling operations with use of the booster without driving the primary thrust producer, the fan. This may eliminate or reduce the need for applying aircraft breaks, may provide better safety conditions for ground crew personnel, may reduce noise, may prevent soak back conditions, among other benefits.

In yet other implementations, particularly where low thrust is desired with continued enhanced cooling operations, as an alternative to ceasing the rotatably driving of the fan whilst still driving the booster, at 1108, the method 1100 can include adjusting a pitch of the fan blades of the fan, e.g., by a pitch change mechanism. Adjusting the pitch of the fan blades can include increasing the pitch of the fan blades, which increases the drag on the blades, which consequently slows down the rotational speed of the fan. This allows for the fan to produce some forward thrust (as opposed to when its operation is ceased), which may be useful for taxiing and other dynamic ground operations. Moreover, allowing the fan to rotate for low thrust ground operations also keeps the gearbox rotating, which may be beneficial for a soakback cooling process. In some embodiments, the fan blades can be pitched so as to maximize the drag on the fan blades. In some embodiments, the fan blades can be pitched to a fully feathered pitch. In some further embodiments, the fan blades can be pitched to a high or coarse pitch, such as a high pitch angle used in cruise flight.

In yet other implementations, in addition to ceasing the rotatably driving of the fan whilst still driving the booster, the method 1100 can include adjusting a pitch of the fan blades of the fan, e.g., to maximize the drag on the fan blades. In some further implementations, after landing of an aircraft, the method 1100 can include continuing to rotatably drive the fan and the booster whilst also adjusting a pitch of the fan blades, e.g., to a higher pitch position. Thus may allow the fan to produce some low thrust forward movement for taxiing the aircraft to a docking bay and for continued enhanced cooling by way of the booster. Then, when the aircraft is parked, the method 1110 can include ceasing operation of the fan, e.g., by decoupling the fan from the electric machine or causing the electric machine driving the fan to cease producing a torque output. Such a control scheme allows for the fan to rotate during taxiing with high pitch fan blades so as to produce low thrust and the decoupling action after being parked allows for enhanced cooling to take place absent operation of the primary thrust producer, or the fan in this example implementation. Accordingly, the features of 1106 and 1108 can be used to control an electric propulsor after landing for ground operations.

Figure 12:
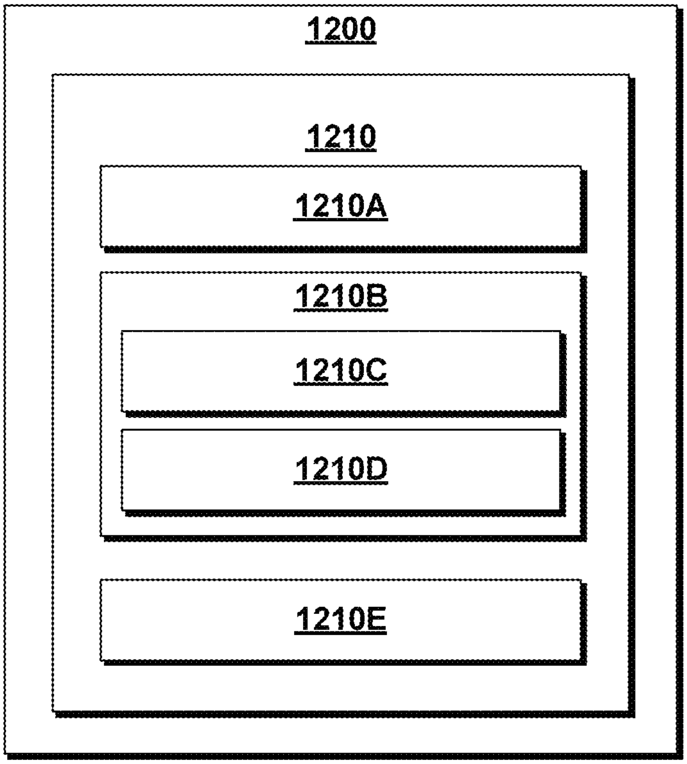
FIG. 12 provides a computing system according to example embodiments of the present disclosure.

FIG. 12 provides a computing system 1200 according to example embodiments of the present disclosure. The computing devices or elements described herein, such as controllers of the power converters 84, 90, 92, the controllers 52, 54, 1052, 1054, the supervisor controller 94, and the computing device 98 of the aircraft 10 of FIG. 1, may include various components and perform various functions of the computing system 1200 provided below.

The computing system 1200 can include one or more computing device(s) 1210. The computing device(s) 1210 can include one or more processor(s) 1210A and one or more memory device(s) 1210B. The one or more processor(s) 1210A can include any suitable processing device, such as a microprocessor, microcontroller, integrated circuit, logic device, and/or other suitable processing device. The one or more memory device(s) 1210B can include one or more computer-executable or computer-readable media, including, but not limited to, non-transitory computer-readable medium, RAM, ROM, hard drives, flash drives, and/or other memory devices.

The one or more memory device(s) 1210B can store information accessible by the one or more processor(s) 1210A, including computer-readable instructions 1210C that can be executed by the one or more processor(s) 1210A. The instructions 1210C can be any set of instructions that, when executed by the one or more processor(s) 1210A, cause the one or more processor(s) 1210A to perform operations, such as controlling the metering valve 274 and controlling the electrical power to the electric machines described herein. The instructions 1210C can be software written in any suitable programming language or can be implemented in hardware. Additionally, and/or alternatively, the instructions 1210C can be executed in logically and/or virtually separate threads on processor(s) 1210A. The memory device(s) 1210B can further store data 1210D that can be accessed by the processor(s) 1210A. For example, the data 1210D can include models, lookup tables, databases, etc.

The computing device(s) 1210 can also include a network interface 1210E used to communicate, for example, with the other components of the computing system 1200 (e.g., via a communication network). The network interface 1210E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Features that can provide enhanced cooling of an electric machine and/or an optional gearbox of an electric propulsor are provided herein. Advantageously, a booster of an electric propulsor can boost or increase pressure of air flowing along a second air flowpath, which can increase the cooling capability of one or more associated heat exchangers. The increased cooling capability of the one or more heat exchangers may enhance the cooling of the one or more electric machines and/or optional gearbox. In some embodiments, the fan, booster, and various pumps of an electric propulsor can be independently driven by separate electric machines or mechanically decoupled so as to decouple the thrust producing elements from the pumps driving cooling fluid between the one or more heat exchangers and the one or more electric machines and/or gearbox. This can advantageously allow for cooling of the one or more electric machines and/or gearbox on an as needed basis independently of the demanded thrust output of the electric propulsor. Also, the decoupling of the thrust producing elements from the pumps may be particularly advantageous after landing of an aircraft, when significant thrust or no thrust at all is needed yet cooling of such components is beneficial. This can prevent a soak back condition prior to complete shutdown. In addition, the electric propulsors disclosed herein may provide other advantages, benefits, and technical effects.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An electric propulsor, comprising: a core cowl; an outer cowl, a first air flowpath being defined outward of the outer cowl and a second air flowpath being defined between the core cowl and the outer cowl; one or more electric machines; a fan having a plurality of fan blades, the fan being rotatably drivable by at least one of the one or more electric machines; a booster having a plurality of airfoils disposed at least in part in the second air flowpath, the booster being rotatably drivable by at least one of the one or more electric machines for compressing air flowing along the second air flowpath; and a heat exchanger disposed within the second air flowpath downstream of the booster, the heat exchanger being in thermal communication with at least one of the one or more electric machines.

The electric propulsor of any preceding clause, wherein the fan and the booster are rotatably drivable by separate electric machines of the one or more electric machines.

The electric propulsor of any preceding clause, wherein the fan and the booster are mechanically coupled with and driven by a first electric machine of the one or more electric machines.

The electric propulsor of any preceding clause, wherein the at least one of the one or more electric machines that rotatably drives the fan is a first electric machine, and wherein the electric propulsor further comprises: a gearbox; and a shaft system having a first shaft mechanically coupling the first electric machine and the gearbox and a second shaft mechanically coupling the gearbox and the fan.

The electric propulsor of any preceding clause, wherein the first shaft mechanically couples the first electric machine and the booster.

The electric propulsor of any preceding clause, wherein the heat exchanger is in thermal communication with the gearbox.

The electric propulsor of any preceding clause, wherein the core cowl defines a third air flowpath in flow communication with the second air flowpath downstream of the booster, the third air flowpath being defined so as to allow air flow to the one or more electric machines.

The electric propulsor of any preceding clause, wherein an outlet of the third air flowpath is in flow communication with the second air flowpath downstream of the heat exchanger.

The electric propulsor of any preceding clause, wherein an outlet of the third air flowpath is defined at a tailcone of the core cowl.

The electric propulsor of any preceding clause, further comprising: a metering valve positioned along the third air flowpath at or downstream of the one or more electric machines, the metering valve being controllable to modulate air flow exiting: i) an outlet of the third air flowpath defined in flow communication with the second air flowpath downstream of the heat exchanger; and ii) an outlet of the third air flowpath defined at a tailcone of the core cowl.

The electric propulsor of any preceding clause, wherein the at least one of the one or more electric machines that rotatably drives the fan is a first electric machine and the at least one of the one or more electric machines that rotatably drives the booster is a second electric machine, and wherein the electric propulsor further comprises: a gearbox mechanically coupling the first electric machine and the fan; and a cooling circuit having one or more delivery lines fluidly coupling the heat exchanger and the gearbox, the first electric machine, and the second electric machine, one or more return lines fluidly coupling the gearbox, the first electric machine, and the second electric machine with the heat exchanger, and an oil pump to move cooling fluid along the one or more delivery lines and the one or more return lines, and wherein the heat exchanger is in thermal communication with the gearbox, the first electric machine, and the second electric machine via the cooling circuit.

The electric propulsor of any preceding clause, wherein the oil pump is driven by the second electric machine.

The electric propulsor of any preceding clause, further comprising: a third electric machine, wherein the oil pump is driven by the third electric machine.

The electric propulsor of any preceding clause, wherein the heat exchanger is a first heat exchanger positioned along a first cooling circuit positioned onboard the electric propulsor, and wherein the electric propulsor further comprises: a second heat exchanger disposed within the second air flowpath downstream of the booster, the second heat exchanger being in thermal communication with at least one offboard system through a second cooling circuit that is positioned at least in part offboard the electric propulsor.

The electric propulsor of any preceding clause, wherein the outer cowl has a splitter nose and the core cowl defines a tangent point, the splitter nose and the tangent point define an inlet of the second air flowpath, a radial capture distance of the inlet being at least seventy-five percent less than an inlet distance spanning from the splitter nose to the tangent point, the radial capture distance being defined as a difference between a radial distance spanning between the splitter nose and a longitudinal centerline of the electric propulsor and a radial distance spanning between the tangent point and the longitudinal centerline.

The electric propulsor of any preceding clause, wherein the tangent point is a furthest radial outward point of the outer cowl that is aft of a fan of the electric propulsor and forward of the splitter nose along an axial direction defined by the electric propulsor.

The electric propulsor of any preceding clause, wherein the heat exchanger is a first heat exchanger, and wherein the at least one of the one or more electric machines that rotatably drives the fan is a first electric machine and the at least one of the one or more electric machines that rotatably drives the booster is a second electric machine, and wherein the electric propulsor further comprises: a third electric machine; and a fourth electric machine an oil pump driven by the third electric machine; a fluid pump driven by the fourth electric machine; a second heat exchanger disposed within the second air flowpath downstream of the booster; a gearbox mechanically coupling the first electric machine with the fan; a first cooling circuit providing thermal communication between the gearbox and the first heat exchanger; and a second cooling circuit providing thermal communication between the second heat exchanger and the first electric machine, the second electric machine, the third electric machine, and a fourth electric machine.

The electric propulsor of any preceding clause, wherein the fan is positioned downstream of an outlet of the second air flowpath.

An electric propulsor, comprising: a core cowl; an outer cowl, a first air flowpath being defined outward of the outer cowl and a second air flowpath being defined between the core cowl and the outer cowl; a plurality of electric machines; a fan having a plurality of fan blades, the fan being positioned upstream of an inlet of the second air flowpath or downstream of an outlet of the second air flowpath; a booster having a plurality of airfoils disposed at least in part in the second air flowpath, the fan and the booster being rotatably drivable by separate electric machines of the plurality of electric machines; and a heat exchanger disposed at least in part in the second air flowpath downstream of the booster, the heat exchanger being in thermal communication with at least one of the plurality of electric machines.

An electric propulsor, comprising: a core cowl; an outer cowl, a first air flowpath being defined outward of the outer cowl and a second air flowpath being defined between the core cowl and the outer cowl; a plurality of electric machines; a fan having a plurality of fan blades, a booster having a plurality of airfoils disposed at least in part in the second air flowpath; and a cooling circuit including a heat exchanger and a pump for moving cooling fluid along one or more lines of the cooling circuit, the heat exchanger disposed at least in part in the second air flowpath downstream of the booster, the cooling circuit provides thermal communication between the heat exchanger and at least one of the plurality of electric machines, and wherein the fan, the booster, and the pump are rotatably drivable by separate electric machines of the plurality of electric machines.

A method of operating an electric propulsor having a core cowl and an outer cowl, a first air flowpath being defined outward of the outer cowl and a second air flowpath being defined between the core cowl and the outer cowl, the method comprising: rotatably driving, by at least one of one or more electric machines, a fan to produce a first airstream through the first air flowpath; rotatably driving, by at least one of the one or more electric machines, a booster having a plurality of airfoils disposed at least in part in the second air flowpath, wherein a heat exchanger is disposed within the second air flowpath downstream of the booster such that the heat exchanger receives compressed air from the booster to cool cooling fluid circulating between the heat exchanger and at least one of: at least one of the one or more electric machines, a gearbox, and a system positioned offboard the electric propulsor.

The method of any preceding clause, further comprising: ceasing the rotatably driving, by the at least one of the one or more electric machines, the fan whilst continuing the rotatably driving, by the at least one of the one or more electric machines, the booster so that that the heat exchanger continues receiving compressed air from the booster to cool the cooling fluid circulating between the heat exchanger and at least one of: the at least one of the one or more electric machines, and/or the gearbox mechanically coupled with the fan, and/or the system positioned offboard the electric propulsor.

The method of any preceding clause, further comprising: rotatably driving, by the one or more electric machines, a pump that moves the cooling fluid.

The method of any preceding clause, wherein the rotatably driving, by the one or more electric machines, the pump that moves the cooling fluid is continued after the ceasing of the rotatably driving the fan.

The method of any preceding clause, wherein the fan and the booster are rotatably driven by a same electric machine, and wherein ceasing the rotatably driving of the fan comprises mechanically decoupling the fan from the electric machine.

The method of any preceding clause, wherein mechanically decoupling the fan from the electric machine comprises activating a clutch to mechanically decouple the fan from the electric machine.

The method of any preceding clause, wherein the fan and the booster are rotatably driven by different electric machines, and wherein ceasing the rotatably driving of the fan comprises deactivating the electric machine that rotatably drives the fan.

The method of any preceding clause, further comprising: adjusting a pitch of fan blades of the fan whilst continuing the rotatably driving, by the at least one of the one or more electric machines, the booster so that that the heat exchanger continues receiving compressed air from the booster to cool the cooling fluid circulating between the heat exchanger and at least one of: the at least one of the one or more electric machines, and/or the gearbox mechanically coupled with the fan, and/or the system positioned offboard the electric propulsor.

The method of any preceding clause, wherein adjusting the pitch of the fan blades of the fan comprises pitching the fan blades so as to maximize the drag on the fan blades.

The method of any preceding clause, wherein adjusting the pitch of the fan blades of the fan comprises pitching the fan blades to a full feathered pitch.

The method of any preceding clause, further comprising: after landing an aircraft to which the electric propulsor is mounted, adjusting a pitch of fan blades of the fan whilst continuing the rotatably driving, by the at least one of the one or more electric machines, the booster so that that the heat exchanger continues receiving compressed air from the booster to cool the cooling fluid circulating between the heat exchanger and at least one of: the at least one of the one or more electric machines, and/or the gearbox mechanically coupled with the fan, and/or the system positioned offboard the electric propulsor; and, thereafter, ceasing the rotatably driving, by the at least one of the one or more electric machines, the fan whilst continuing the rotatably driving, by the at least one of the one or more electric machines, the booster so that that the heat exchanger continues receiving compressed air from the booster to cool the cooling fluid.

The method of any preceding clause, wherein ceasing the rotatably driving, by the at least one of the one or more electric machines, the fan is performed in response to the aircraft being parked.

An aircraft, comprising: a fuselage; a wing extending from the fuselage; an electric propulsor mounted to the fuselage or the wing, the electric propulsor, comprising: a core cowl; an outer cowl, a first air flowpath being defined outward of the outer cowl and a second air flowpath being defined between the core cowl and the outer cowl; one or more electric machines; a fan having a plurality of fan blades, the fan being rotatably drivable by at least one of the one or more electric machines; a booster having a plurality of airfoils disposed at least in part in the second air flowpath, the booster being rotatably drivable by at least one of the one or more electric machines for compressing air flowing along the second air flowpath; and a heat exchanger disposed within the second air flowpath downstream of the booster, the heat exchanger being in thermal communication with at least one of the one or more electric machines.

We claim:

1. An electric propulsor, comprising:

a core cowl;

an outer cowl, a first air flowpath being defined outward of the outer cowl and a second air flowpath being defined between the core cowl and the outer cowl;

one or more electric machines;

a fan having a plurality of fan blades, the fan being rotatably drivable by at least one of the one or more electric machines;

a booster having a plurality of airfoils disposed at least in part in the second air flowpath, the booster being rotatably drivable by at least one of the one or more electric machines for compressing air flowing along the second air flowpath; and a heat exchanger disposed within the second air flowpath, the heat exchanger fluidly coupled to one or more return lines and one or more delivery lines, the one or more return lines and the one or more delivery lines extending to the heat exchanger within the core cowl, the heat exchanger being in thermal communication with at least one of the one or more electric machines, wherein the booster and the heat exchanger are disposed directly between the core cowl and the outer cowl.

2. The electric propulsor of claim 1, wherein the fan and the booster are rotatably drivable by separate electric machines of the one or more electric machines.

3. The electric propulsor of claim 1, wherein the fan and the booster are mechanically coupled with and driven by a first electric machine of the one or more electric machines.

4. The electric propulsor of claim 1, wherein the at least one of the one or more electric machines that rotatably drives the fan is a first electric machine, and wherein the electric propulsor further comprises:

a gearbox; and a shaft system having a first shaft mechanically coupling the first electric machine and the gearbox and a second shaft mechanically coupling the gearbox and the fan.

5. The electric propulsor of claim 4, wherein the first shaft mechanically couples the first electric machine and the booster.

6. The electric propulsor of claim 4, wherein the heat exchanger is in thermal communication with the gearbox.

7. The electric propulsor of claim 1, wherein the core cowl defines a third air flowpath in flow communication with the second air flowpath downstream of the booster, the third air flowpath being defined so as to allow air flow to the one or more electric machines.

8. The electric propulsor of claim 7, wherein an outlet of the third air flowpath is in flow communication with the second air flowpath downstream of the heat exchanger.

9. The electric propulsor of claim 7, wherein an outlet of the third air flowpath is defined at a tailcone of the core cowl.

10. The electric propulsor of claim 7, further comprising:

a metering valve positioned along the third air flowpath at or downstream of the one or more electric machines, the metering valve being controllable to modulate air flow exiting: i) an outlet of the third air flowpath defined in flow communication with the second air flowpath downstream of the heat exchanger; and ii) an outlet of the third air flowpath defined at a tailcone of the core cowl.

11. The electric propulsor of claim 1, wherein the at least one of the one or more electric machines that rotatably drives the fan is a first electric machine and the at least one of the one or more electric machines that rotatably drives the booster is a second electric machine, and wherein the electric propulsor further comprises:

a gearbox mechanically coupling the first electric machine and the fan; and a cooling circuit having the one or more delivery lines fluidly coupling the heat exchanger and the gearbox, the first electric machine, and the second electric machine, the one or more return lines fluidly coupling the gearbox, the first electric machine, and the second electric machine with the heat exchanger, and an oil pump to move cooling fluid along the one or more delivery lines and the one or more return lines, and wherein the heat exchanger is in thermal communication with the gearbox, the first electric machine, and the second electric machine via the cooling circuit.

12. The electric propulsor of claim 11, wherein the oil pump is driven by the second electric machine.

13. The electric propulsor of claim 11, further comprising:

a third electric machine, wherein the oil pump is driven by the third electric machine.

14. The electric propulsor of claim 1, wherein the heat exchanger is a first heat exchanger positioned along a first cooling circuit positioned onboard the electric propulsor, and wherein the electric propulsor further comprises:

a second heat exchanger disposed within the second air flowpath, the second heat exchanger being in thermal communication with at least one offboard system through a second cooling circuit that is positioned at least in part offboard the electric propulsor.

15. The electric propulsor of claim 1, wherein the outer cowl has a splitter nose and the core cowl defines a tangent point, the splitter nose and the tangent point define an inlet of the second air flowpath, a radial capture distance of the inlet being at least seventy-five percent less than an inlet distance spanning from the splitter nose to the tangent point, the radial capture distance being defined as a difference between a radial distance spanning between the splitter nose and a longitudinal centerline of the electric propulsor and a radial distance spanning between the tangent point and the longitudinal centerline.

16. The electric propulsor of claim 15, wherein the tangent point is a furthest radial outward point of the outer cowl that is aft of the fan of the electric propulsor and forward of the splitter nose along an axial direction defined by the electric propulsor.

17. The electric propulsor of claim 1, wherein the heat exchanger is a first heat exchanger, and wherein the at least one of the one or more electric machines that rotatably drives the fan is a first electric machine and the at least one of the one or more electric machines that rotatably drives the booster is a second electric machine, and wherein the electric propulsor further comprises:

a third electric machine;

a fourth electric machine;

an oil pump driven by the third electric machine;

a fluid pump driven by the fourth electric machine;

a second heat exchanger disposed within the second air flowpath downstream of the booster;

a gearbox mechanically coupling the first electric machine with the fan;

a first cooling circuit providing thermal communication between the gearbox and the first heat exchanger; and a second cooling circuit providing thermal communication between the second heat exchanger and the first electric machine, the second electric machine, the third electric machine, and the fourth electric machine.

18. The electric propulsor of claim 1, wherein the fan is positioned downstream of an outlet of the second air flowpath.

19. An electric propulsor, comprising:

a core cowl;

an outer cowl, a first air flowpath being defined outward of the outer cowl and a second air flowpath being defined between the core cowl and the outer cowl;

a plurality of electric machines;

a fan having a plurality of fan blades, the fan being positioned upstream of an inlet of the second air flowpath or downstream of an outlet of the second air flowpath;

a booster having a plurality of airfoils disposed at least in part in the second air flowpath, the fan and the booster being rotatably drivable by separate electric machines of the plurality of electric machines; and a heat exchanger disposed at least in part in the second air flowpath downstream of the booster, the heat exchanger fluidly coupled to one or more return lines and one or more delivery lines, the one or more return lines and the one or more delivery lines extending to the heat exchanger within the core cowl, the heat exchanger being in thermal communication with at least one of the plurality of electric machines, wherein the booster and the heat exchanger are disposed directly between the core cowl and the outer cowl.

20. An electric propulsor, comprising:

a core cowl;

an outer cowl, a first air flowpath being defined outward of the outer cowl and a second air flowpath being defined between the core cowl and the outer cowl;

a plurality of electric machines;

a fan having a plurality of fan blades;

a booster having a plurality of airfoils disposed at least in part in the second air flowpath; and a cooling circuit including a heat exchanger and a pump for moving cooling fluid along one or more lines of the cooling circuit, the heat exchanger disposed at least in part in the second air flowpath, the cooling circuit provides thermal communication between the heat exchanger and at least one of the plurality of electric machines, wherein the cooling circuit includes one or more return lines and one or more delivery lines fluidly coupled to the heat exchanger, the one or more return lines and the one or more delivery lines extending to the heat exchanger within the core cowl, and wherein the fan, the booster, and the pump are rotatably drivable by separate electric machines of the plurality of electric machines, and wherein the booster and the heat exchanger are disposed directly between the core cowl and the outer cowl.

* * * * *